Figure 1:
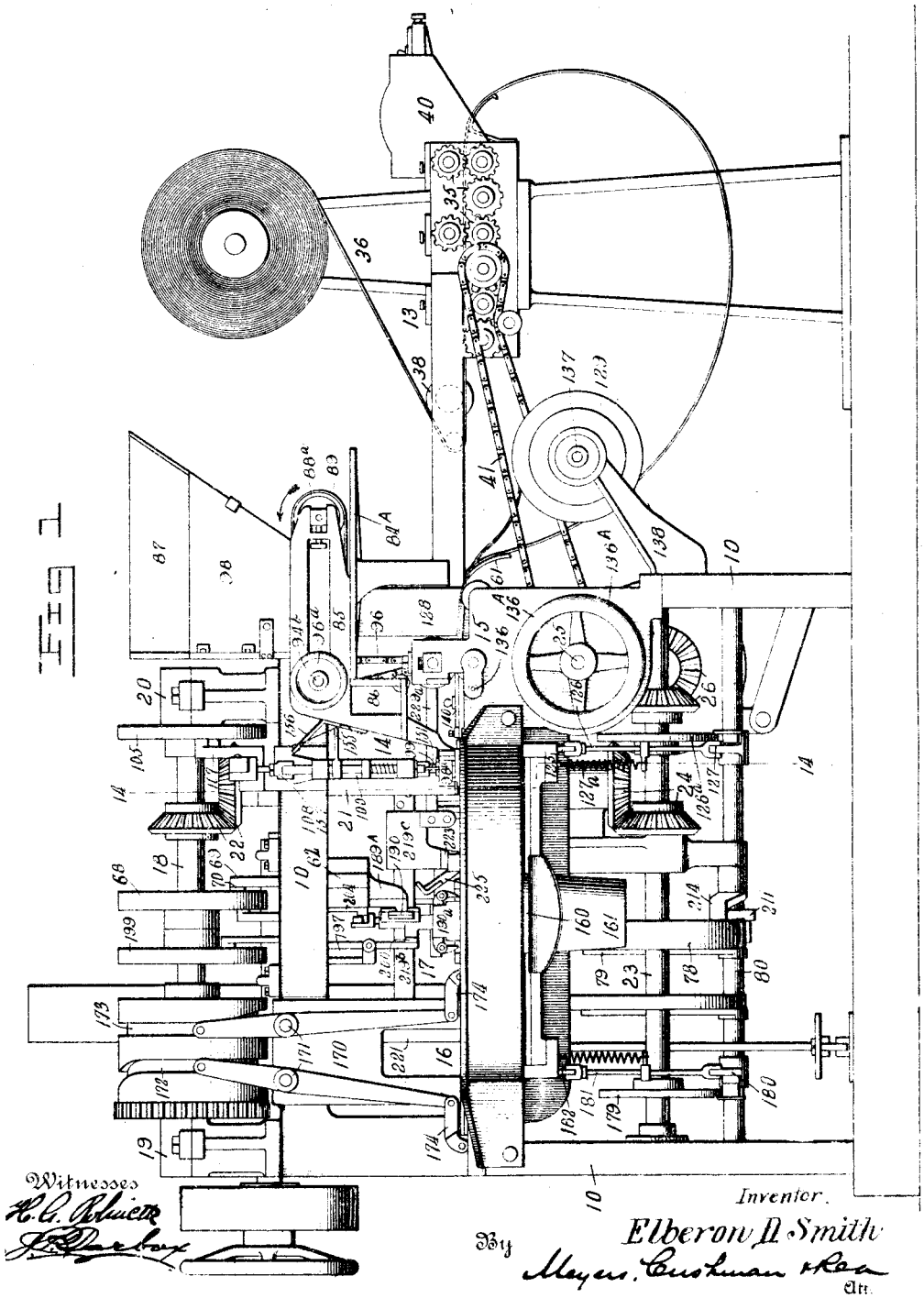

E. D. SMITH.
MACHINE FOR COUNTING AND PACKAGING CIGARETTES.
APPLICATION FILED DEC. 31, 1909.

1,201,370.

Patented Oct. 17, 1916.
21 SHEETS—SHEET 2.

Witnesses
H. C. Robinette

Inventor
Elberon D. Smith
By Meyers, Cushman &Ba
Attorney

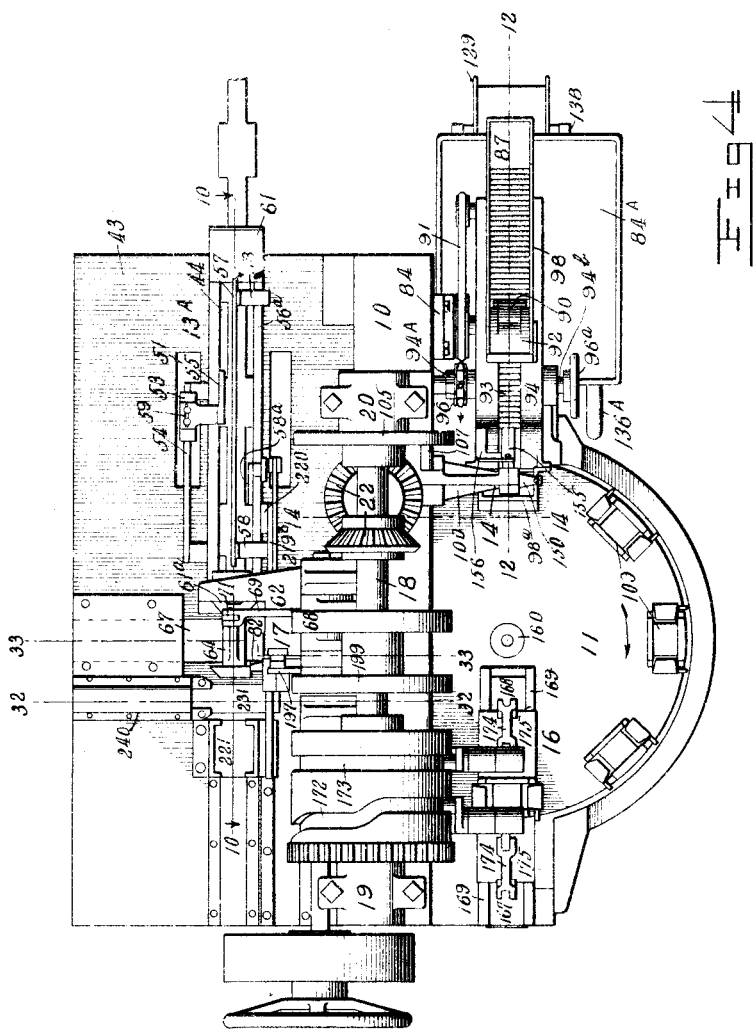

E. D. SMITH.
MACHINE FOR COUNTING AND PACKAGING CIGARETTES.
APPLICATION FILED DEC. 31, 1909.

1,201,370.

Patented Oct. 17, 1916.
21 SHEETS—SHEET 5.

Inventor
Elberon D. Smith

Witnesses

By Meyers, Cushman & Rea
Attorney

E. D. SMITH.
MACHINE FOR COUNTING AND PACKAGING CIGARETTES.
APPLICATION FILED DEC. 31, 1909.
1,201,370.
Patented Oct. 17, 1916.
21 SHEETS—SHEET 6.
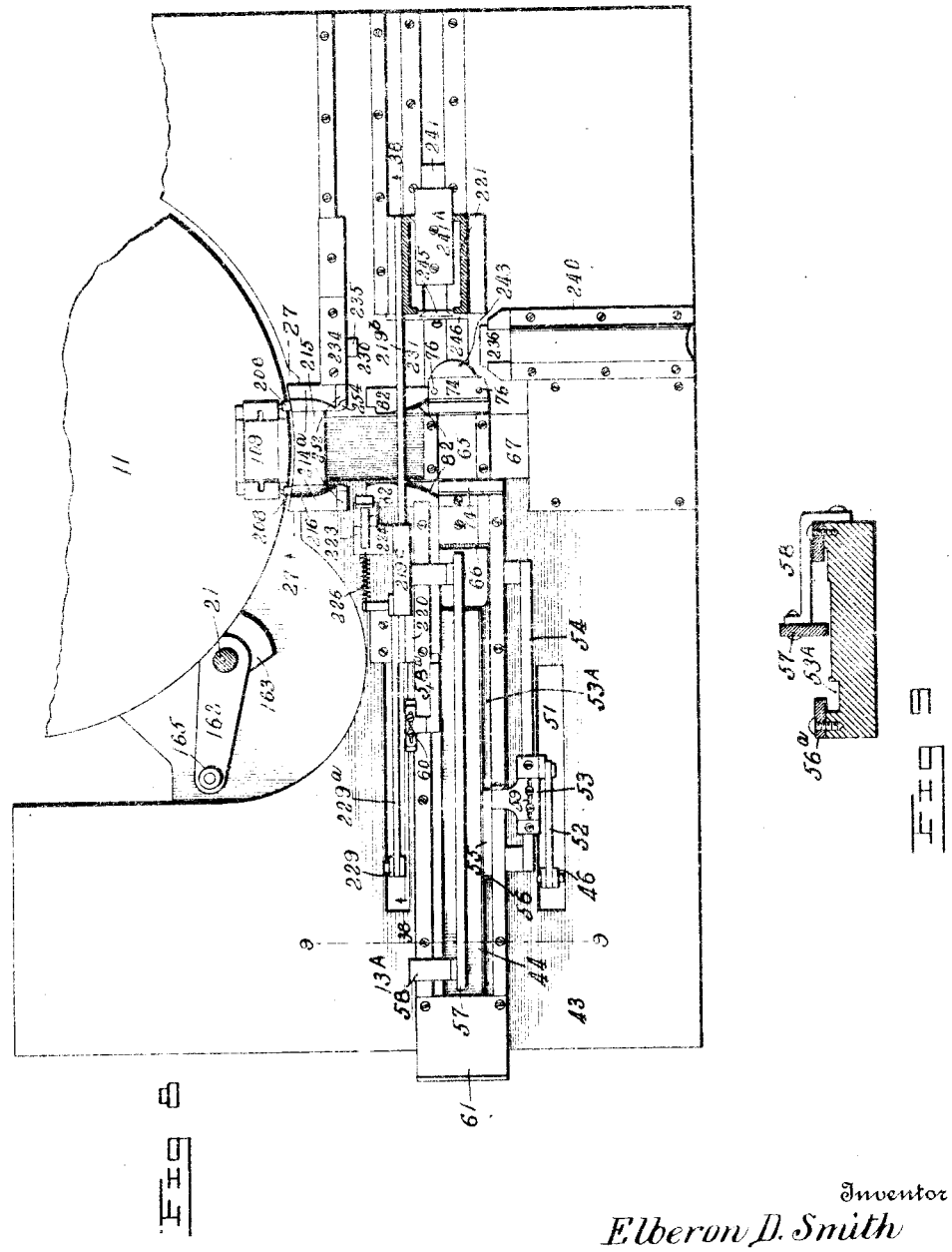
Inventor
Elberon D. Smith
Witnesses
By Meyers Cushman & Rea
Attorney E. D. SMITH.
MACHINE FOR COUNTING AND PACKAGING CIGARETTES.
APPLICATION FILED DEC. 31, 1909.
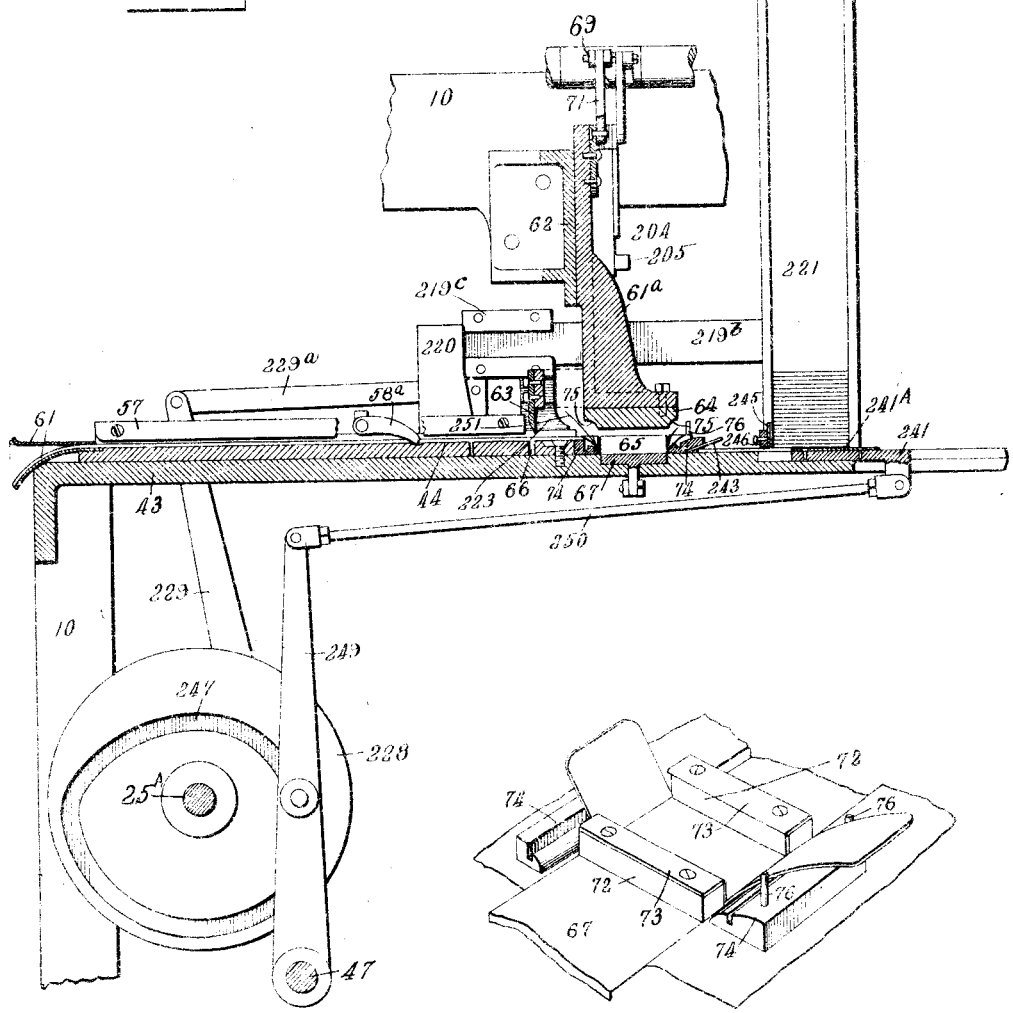

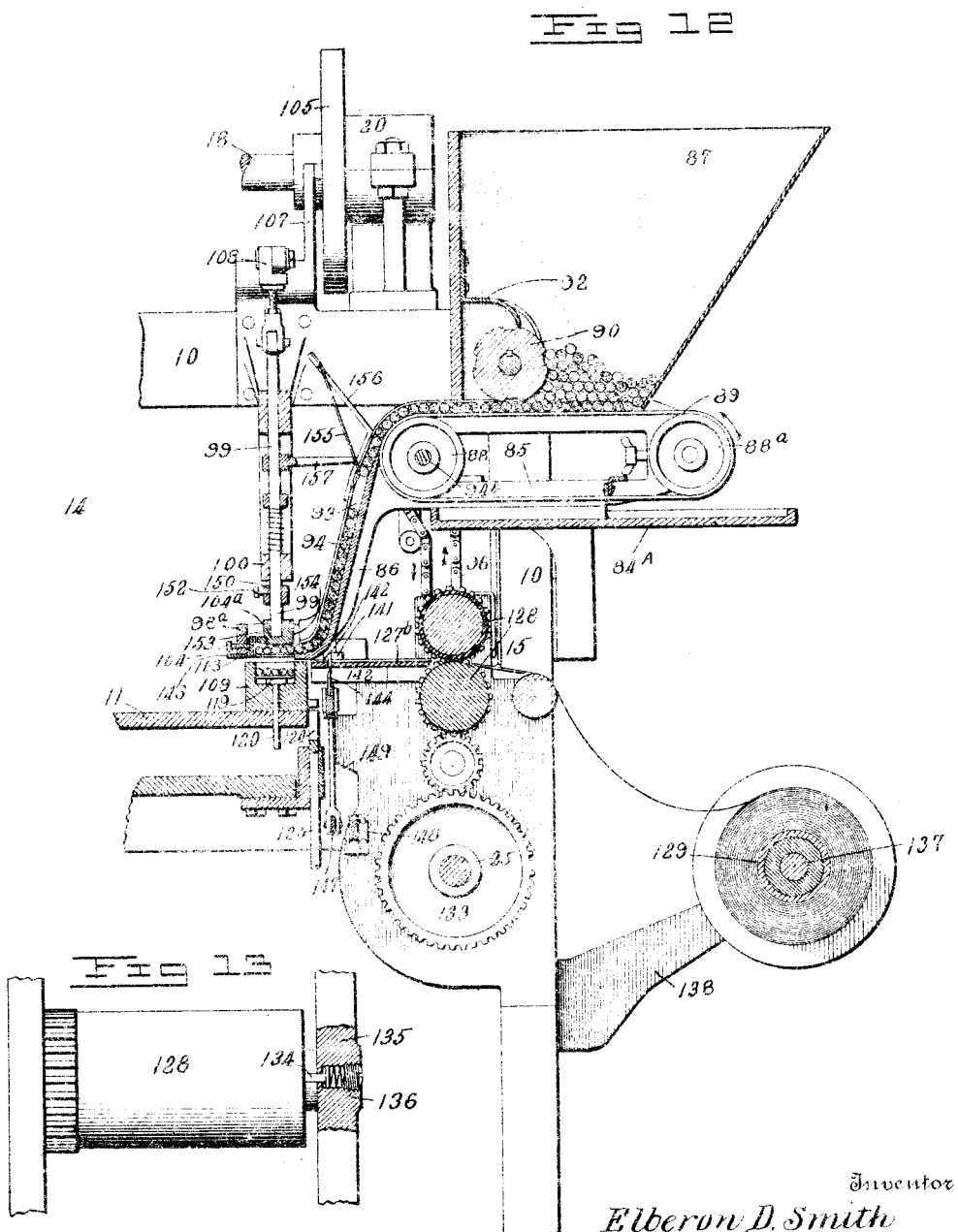

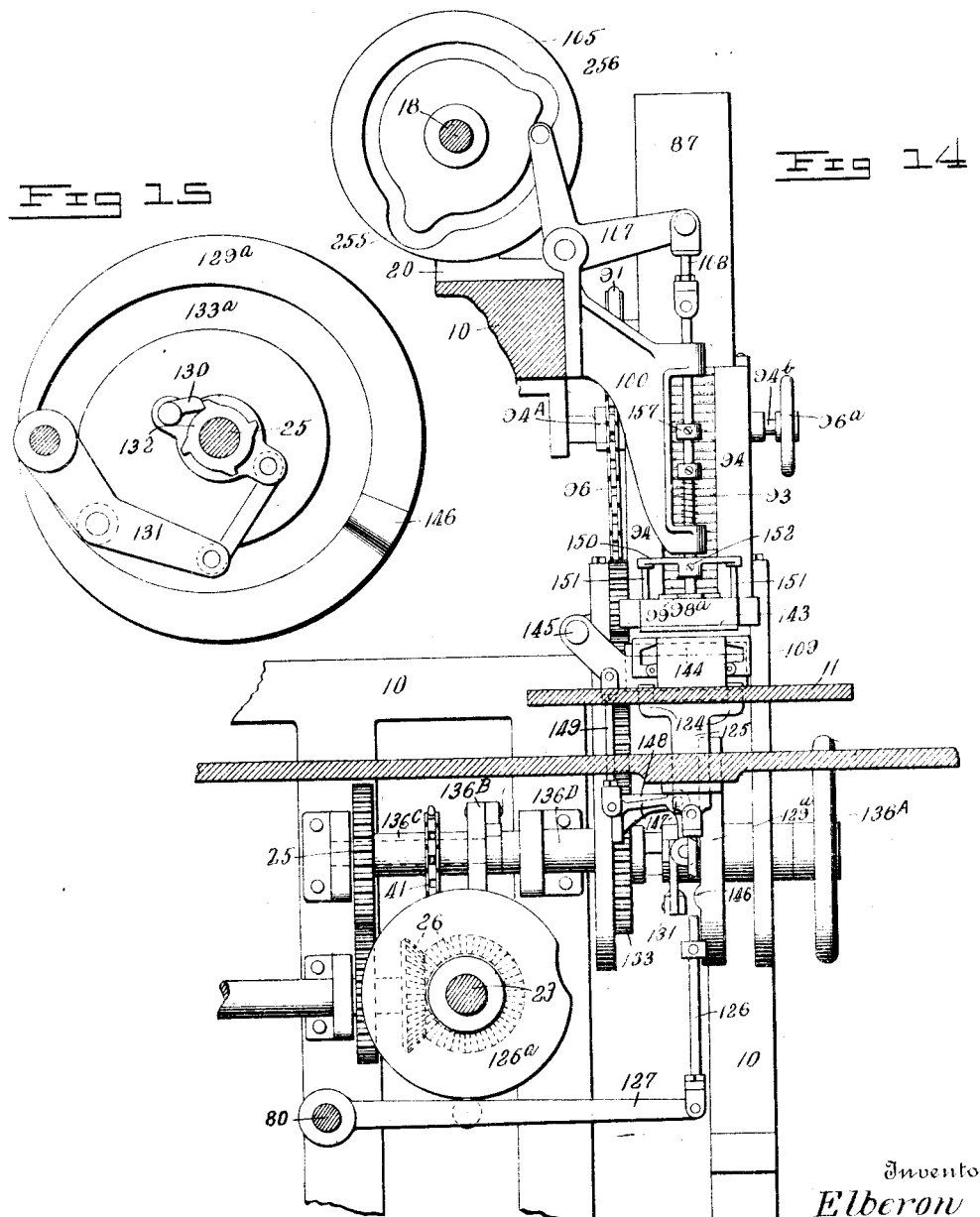

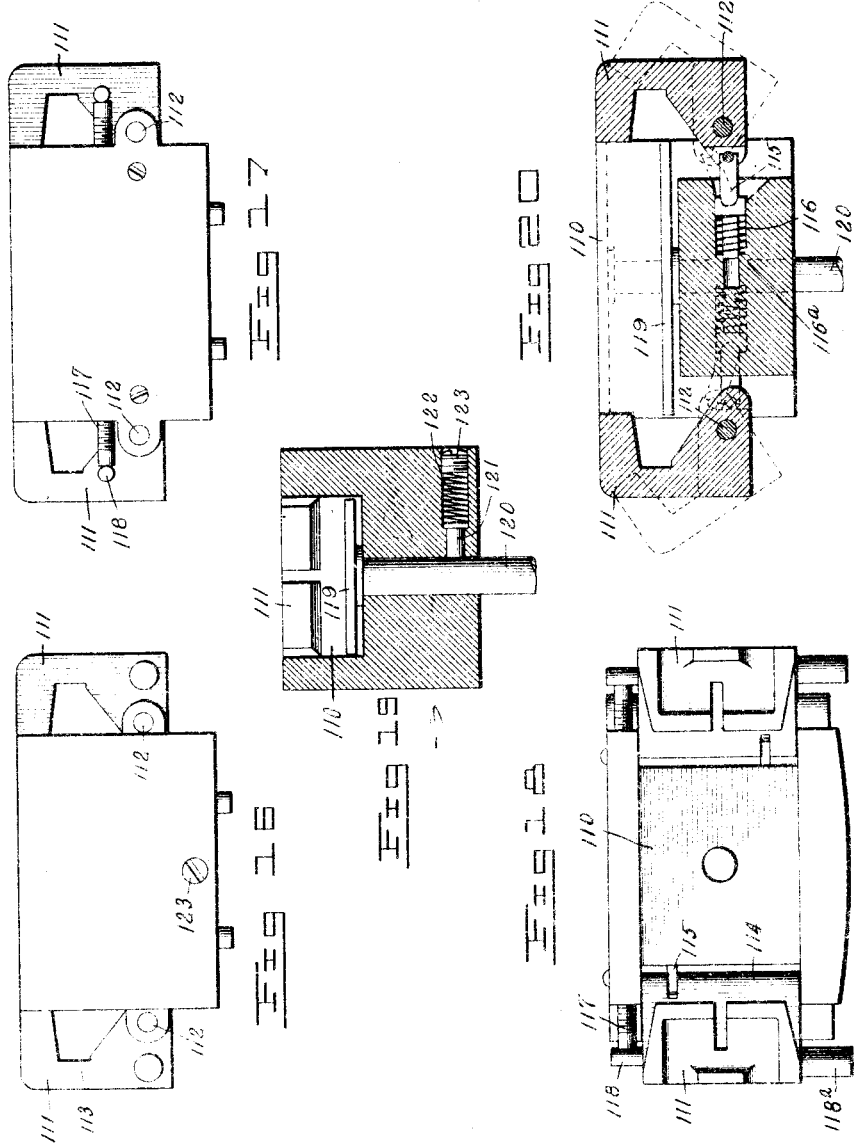

E. D. SMITH.
MACHINE FOR COUNTING AND PACKAGING CIGARETTES.
APPLICATION FILED DEC. 31, 1909.
1,201,370.
Patented Oct. 17, 1916
21 SHEETS—SHEET 11.
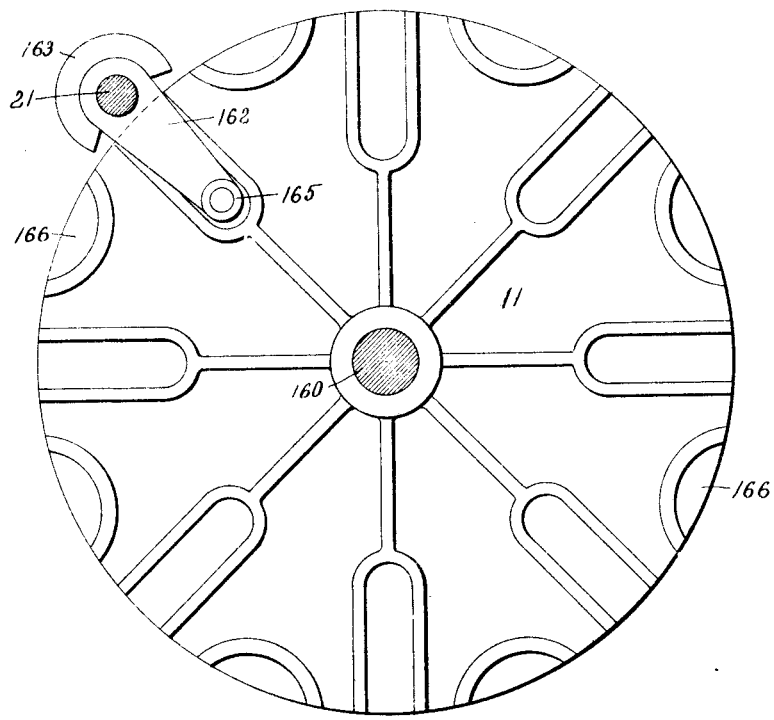
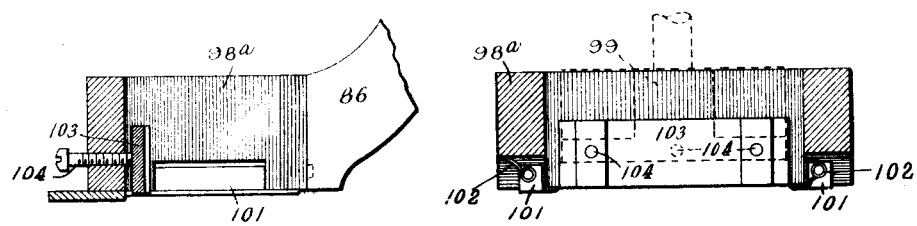
Witnesses
H. C. Robinette
[signature]
Inventor
Elberon D. Smith
By Meyers, Cushman & Rea
Attorney

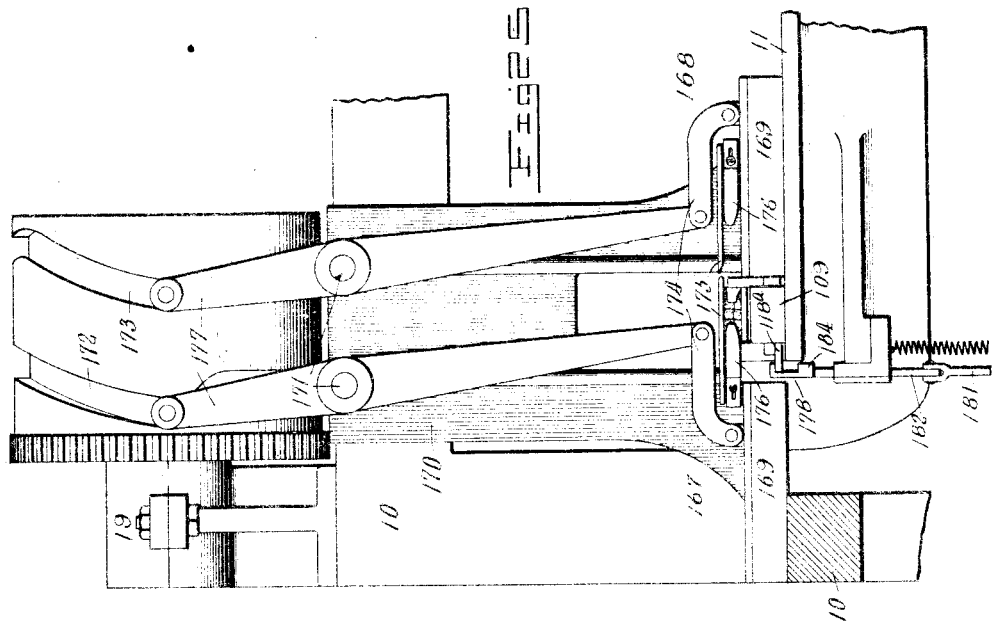
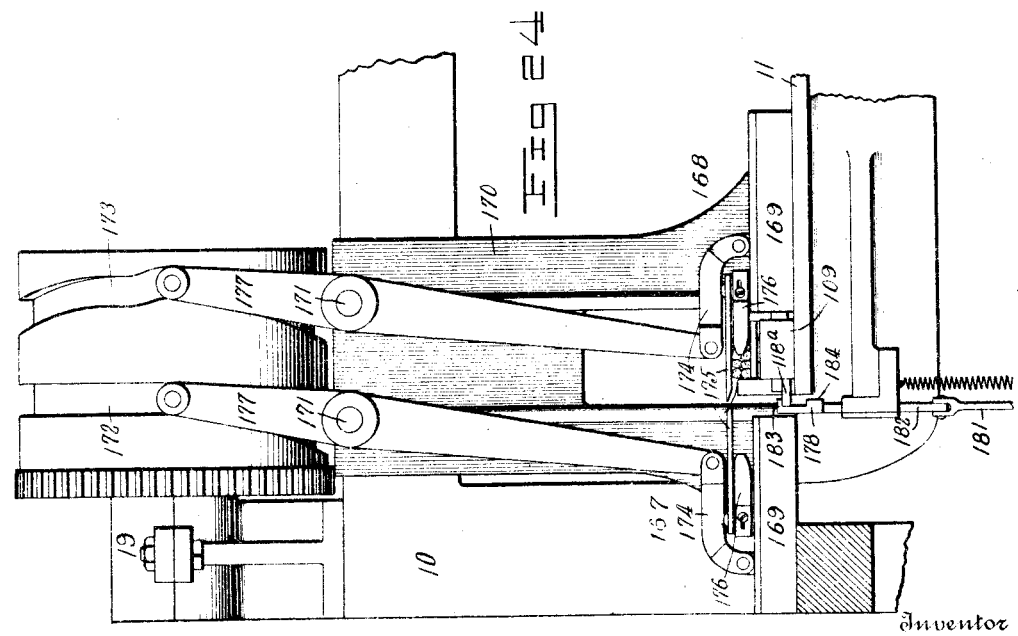

E. D. SMITH.
MACHINE FOR COUNTING AND PACKAGING CIGARETTES.
APPLICATION FILED DEC. 31, 1909.
1,201,370.
Patented Oct. 17, 1916.
21 SHEETS—SHEET 13.
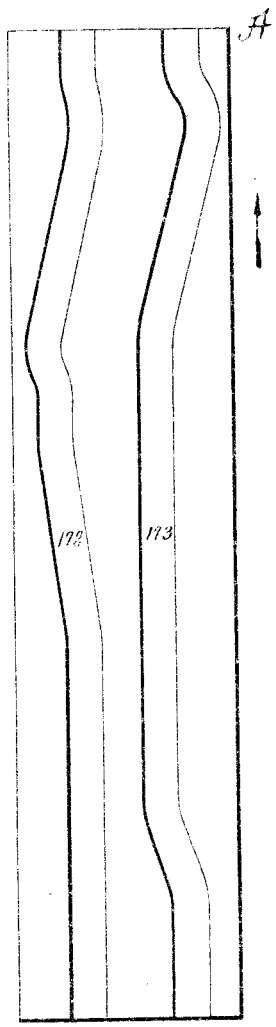
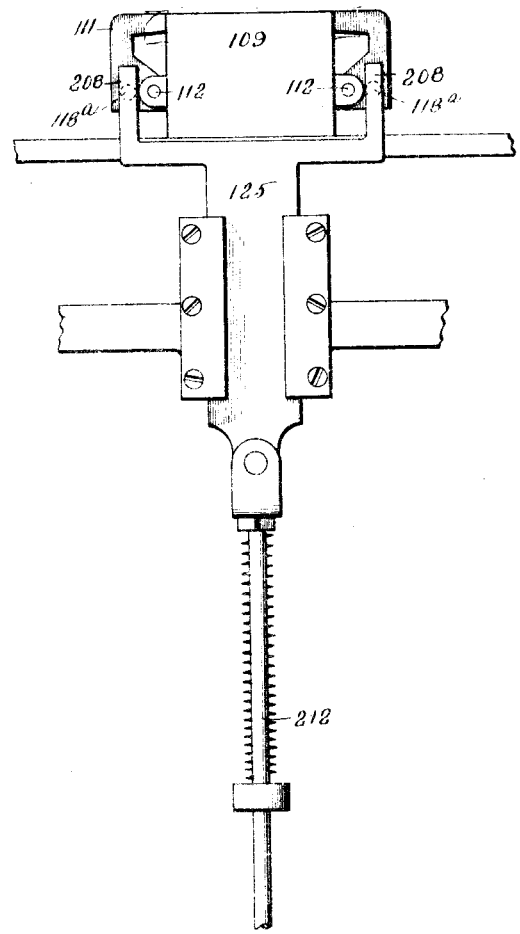
Inventor
Elberon D. Smith
Witnesses
By Meyers Cushman &Rea
Attorney

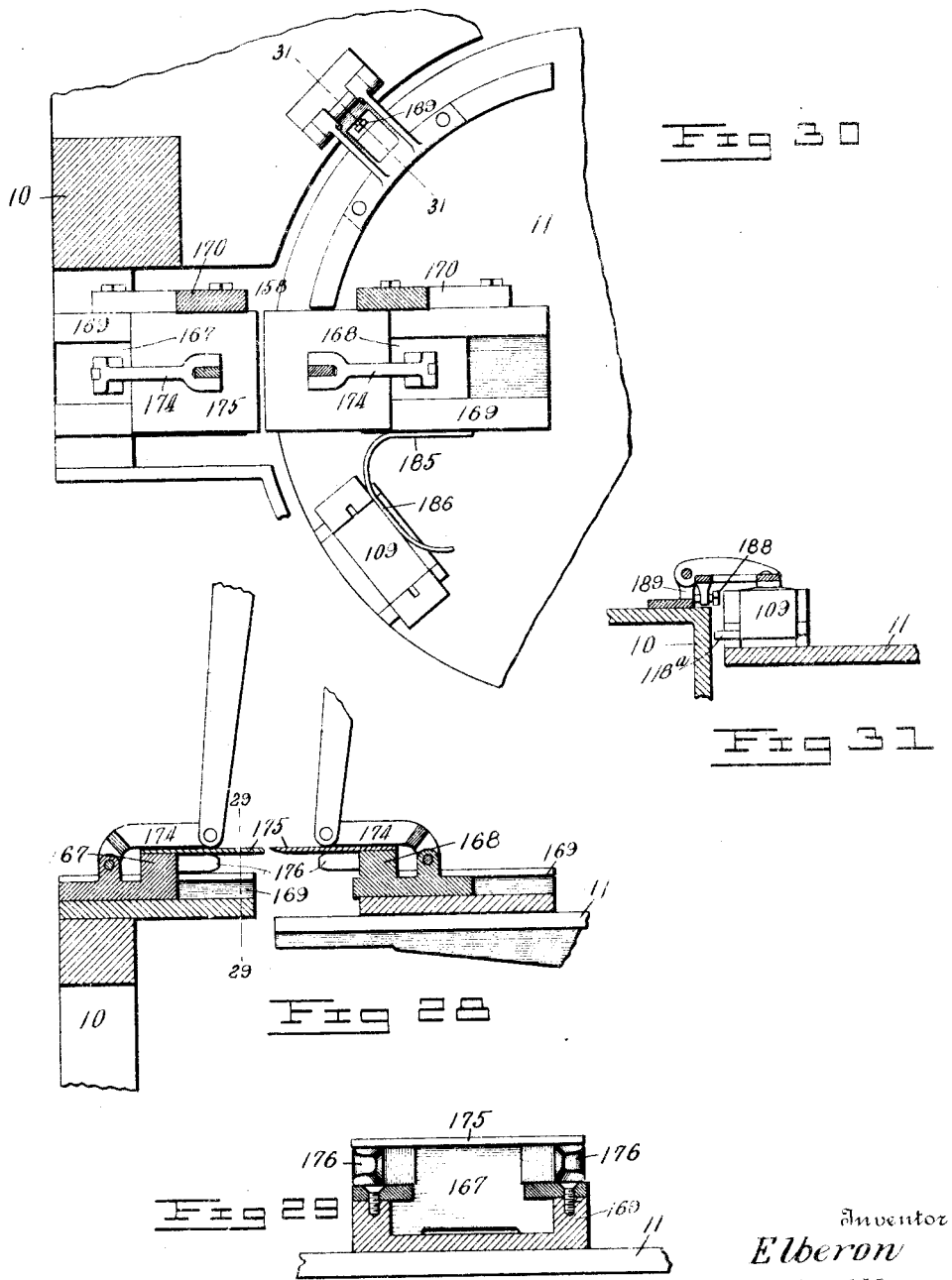

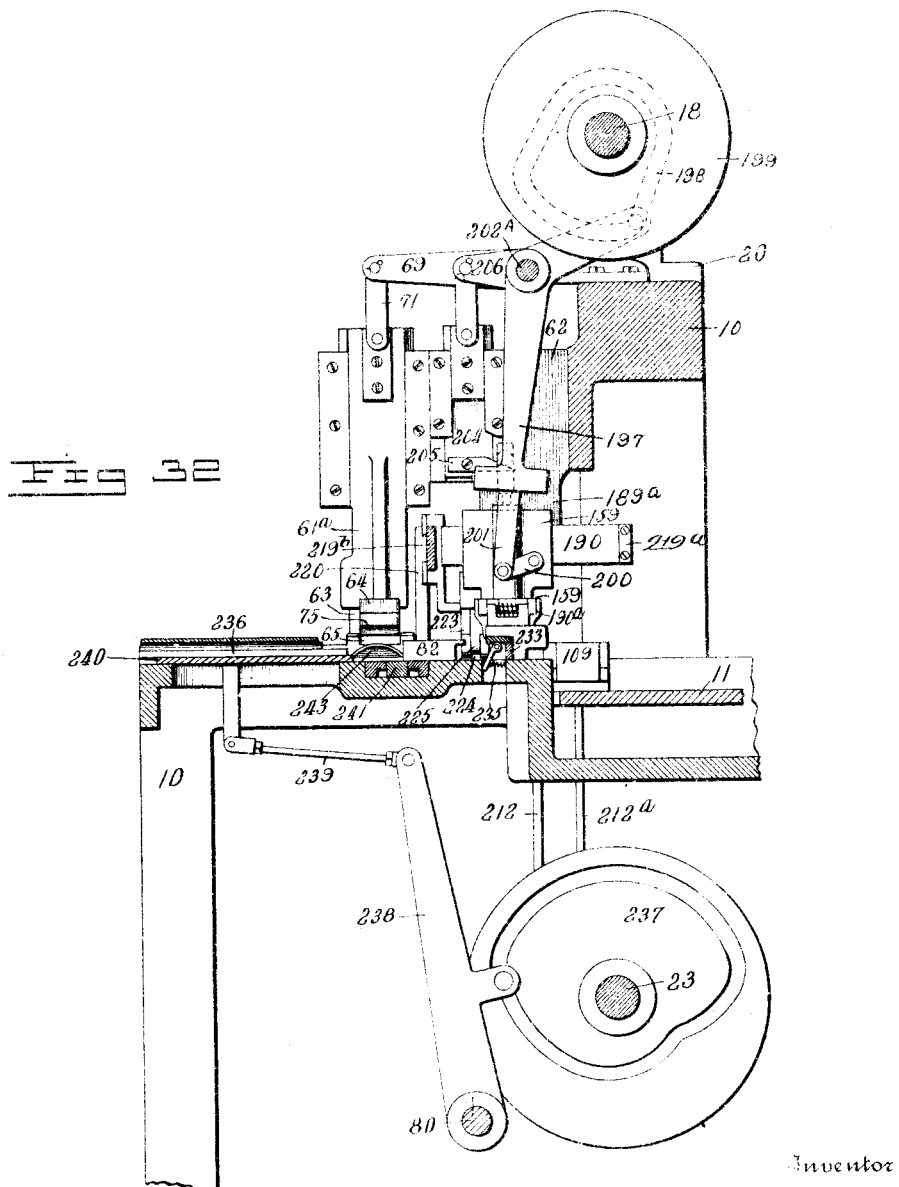

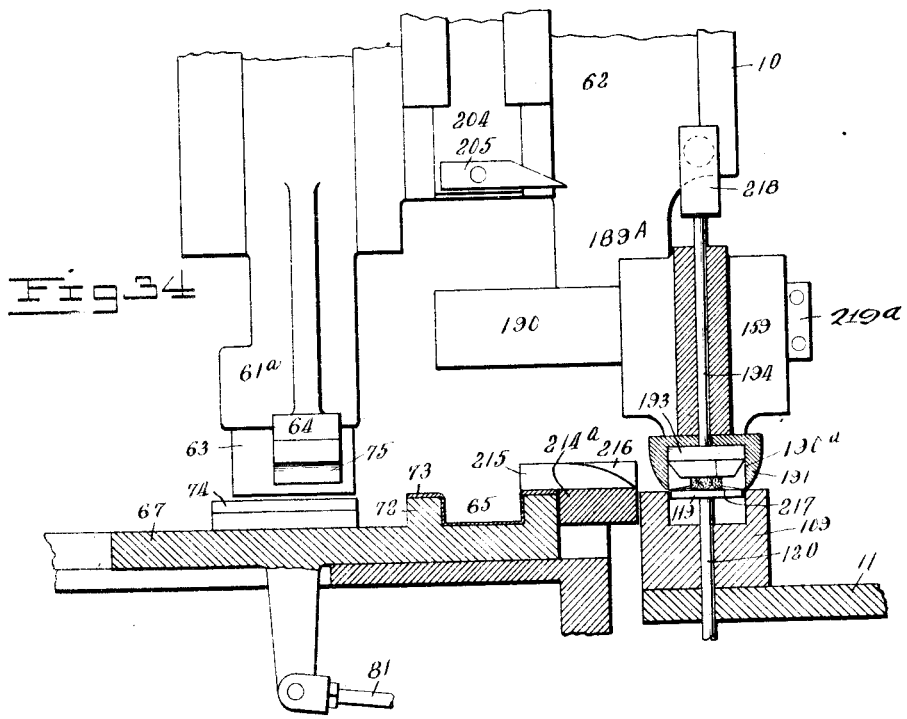

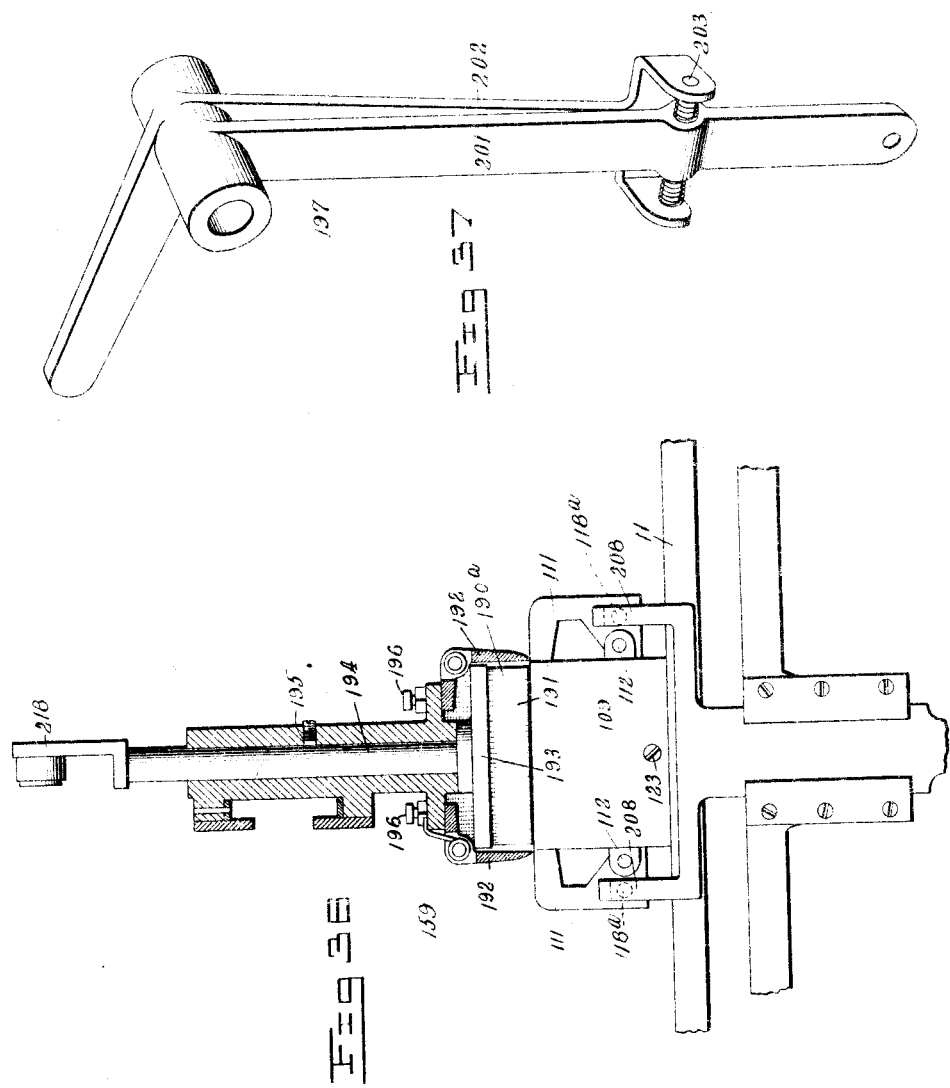

E. D. SMITH.
MACHINE FOR COUNTING AND PACKAGING CIGARETTES.
APPLICATION FILED DEC. 31, 1909.
1,201,370.
Patented Oct. 17, 1916.
21 SHEETS—SHEET 19.
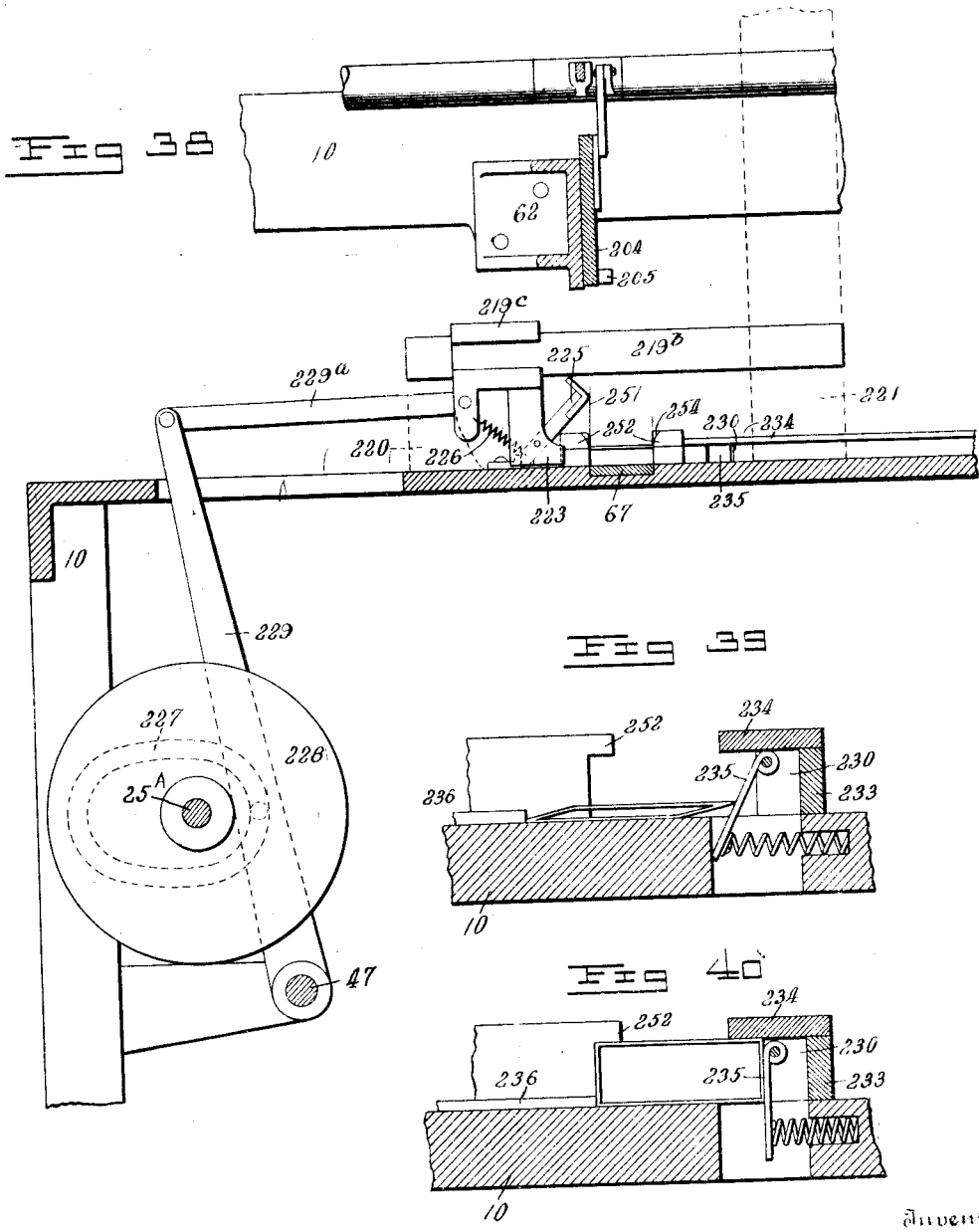

E. D. SMITH.
MACHINE FOR COUNTING AND PACKAGING CIGARETTES.
APPLICATION FILED DEC. 31, 1909.

1,201,370.

Patented Oct. 17, 1916.
21 SHEETS—SHEET 20.

Inventor
Elberon D. Smith

Witnesses

By Meyers Cushman Rhea
Attorney

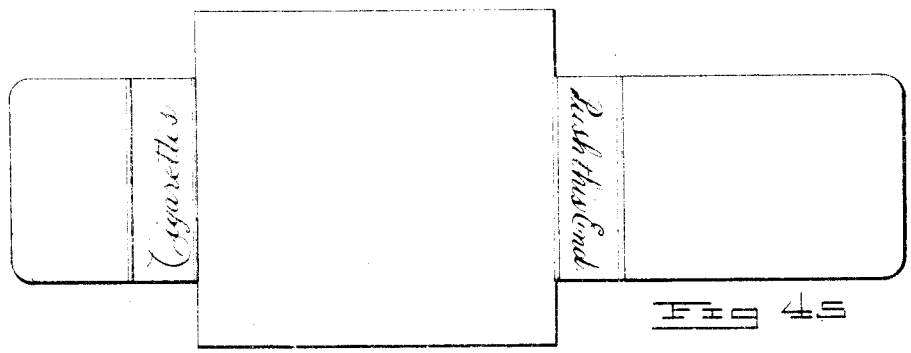
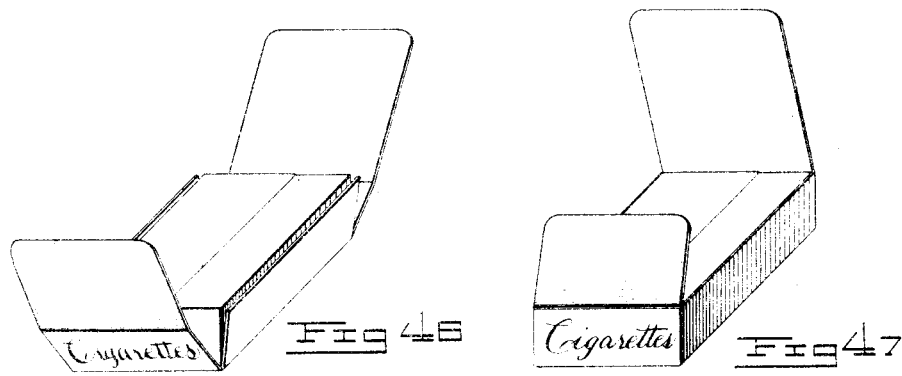
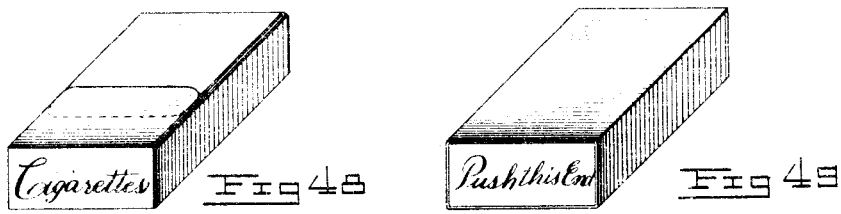

UNITED STATES PATENT OFFICE.

ELBERON D. SMITH, OF BROOKLYN, NEW YORK, ASSIGNOR, BY MESNE ASSIGNMENTS, TO AMERICAN MACHINE & FOUNDRY COMPANY, OF NEW YORK, N. Y., A CORPORATION OF NEW JERSEY.

MACHINE FOR COUNTING AND PACKAGING CIGARETTES.

1,201,370.  Specification of Letters Patent.  Patented Oct. 17, 1916.

Application filed December 31, 1909. Serial No. 535,785.

*To all whom it may concern:*

Be it known that I, ELBERON D. SMITH, a citizen of the United States, residing at Brooklyn, in the county of Kings and State of New York, have invented new and useful Improvements in Machines for Counting and Packaging Cigarettes, of which the following is a specification.

My invention relates to a machine for counting and packaging cigarettes.

The package which my machine turns out is made up of a wrapping of paper and foil directly around the cigarettes, and a wrapping of cardboard which constitutes the slide of a box into which the wrapped cigarettes are placed. The box being of a slide type, comprises a shell which incloses the slide and the wrapped package. The slide itself, instead of being a self-supporting structure, is in the form of a folder provided with sliding end flaps, and it is essentially a wrapper, being the last covering placed on the packages excepting the shell, and being held in shape as a slide both by the package which it incases and the shell of the box. The box comprising the shell and the slide is of the form commonly known as a cigarette box.

In the accomplishment of my invention, a number of distinct and well defined mechanisms are combined and collated in a single machine to produce the package desired. But these mechanisms are not separate from or independent of each other in all cases; in fact, for the most part and throughout the main body of my machine, these mechanisms are so closely interrelated through the coöperation of their several parts and through the functioning of some parts in two or more mechanisms, that they may well be said to be dependent upon each other. By this coöperation and double functioning of parts, a most efficient and rapid operation is secured, and the first cost of the machine is materially decreased. These mechanisms comprise, in brief, a mechanism for making cardboard wrappers or slides for the boxes, a mechanism for printing the same, a mechanism for feeding and counting cigarettes in groups of a certain number and of a certain shape, a mechanism for supplying paper and foil for the first wrapping of the package, a mechanism for wrapping the cigarettes of the package in this foil and paper, and lastly, a mechanism for wrapping in the carboard slide, boxing in the shell, and delivering the completed package in box form from the machine. All these mechanisms are mechanically constructed and so grouped and arranged about the main frame of the machine as to secure the most efficient results.

The machine of my invention is particularly designed for wrapping in foil, and many of its parts are designed to accomplish this in a most efficient and rapid manner. The most delicate foil may be used in my machine and the packages produced will always be close, neat and smooth. Nor is there tearing of the foil during any of the operations of packaging.

Figure 2:
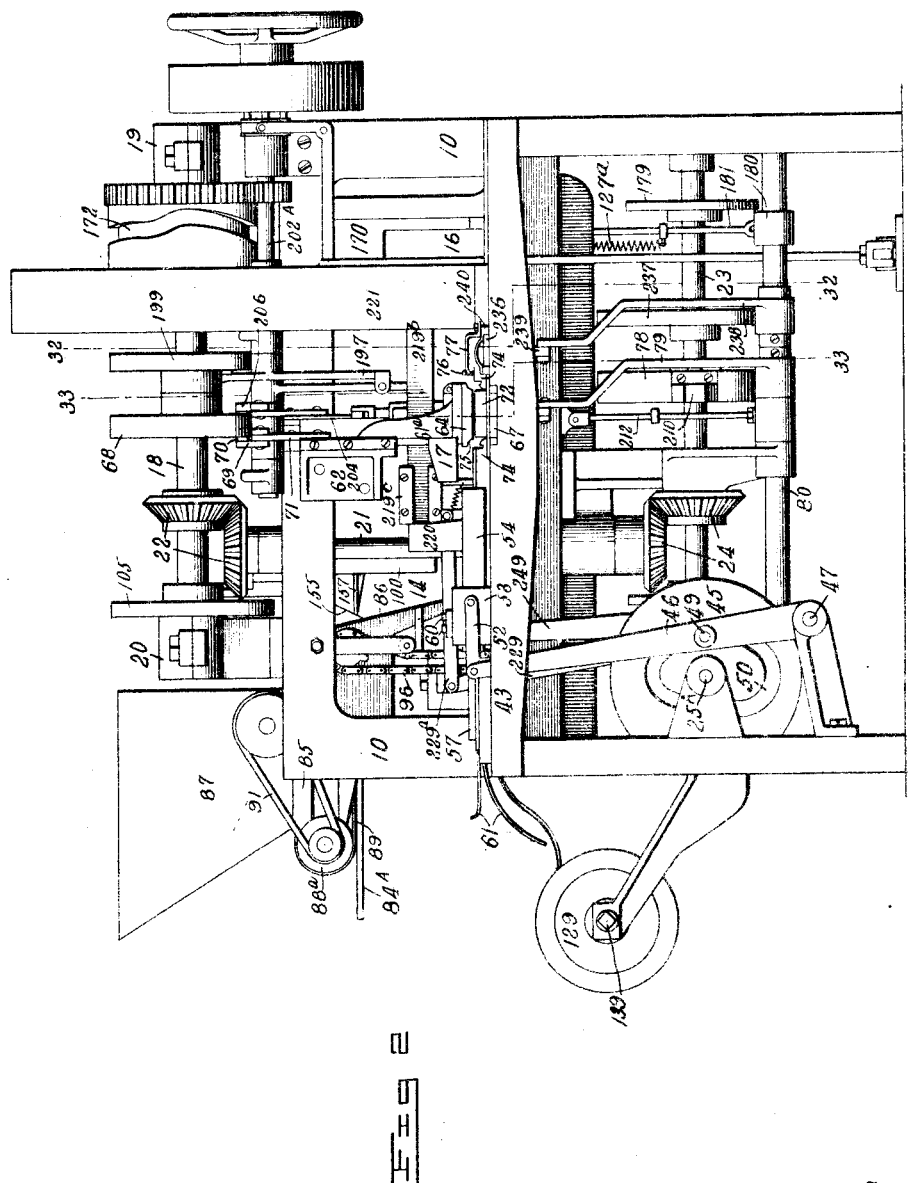
Figure 3:
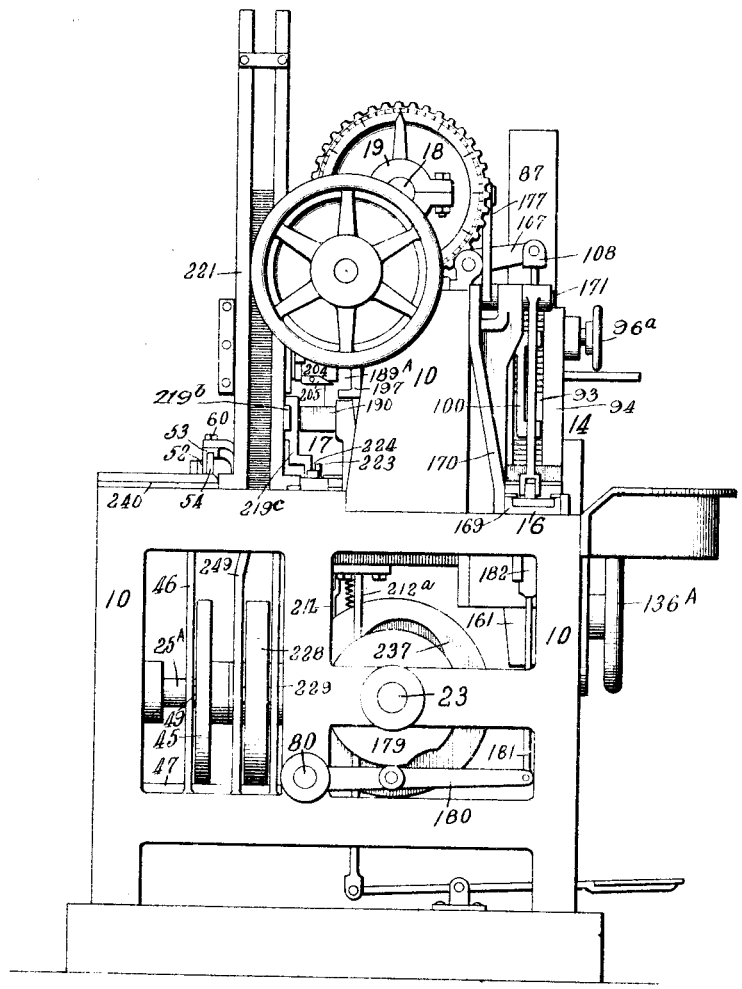
Figure 7:
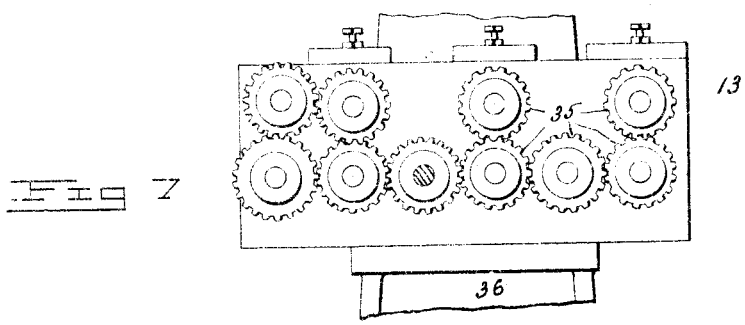
Figure 5:
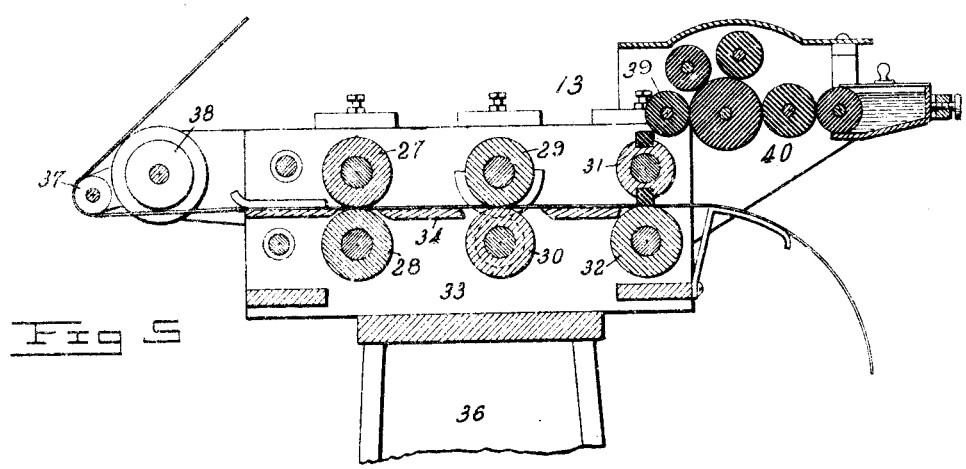
Figure 6:
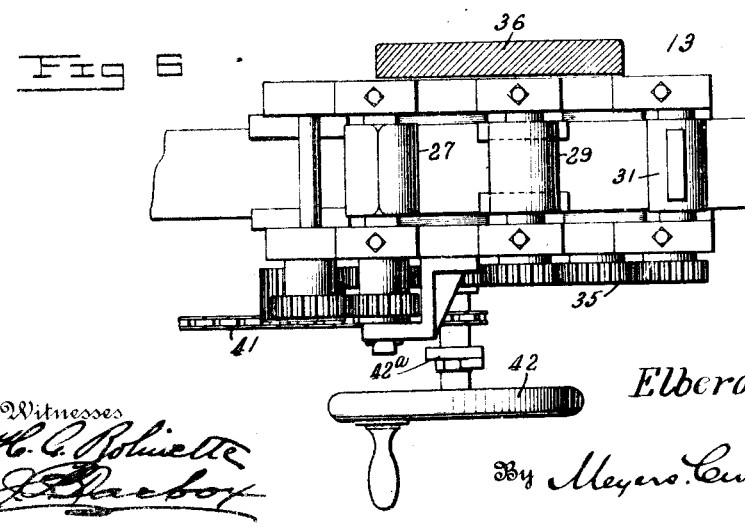
Figure 33:
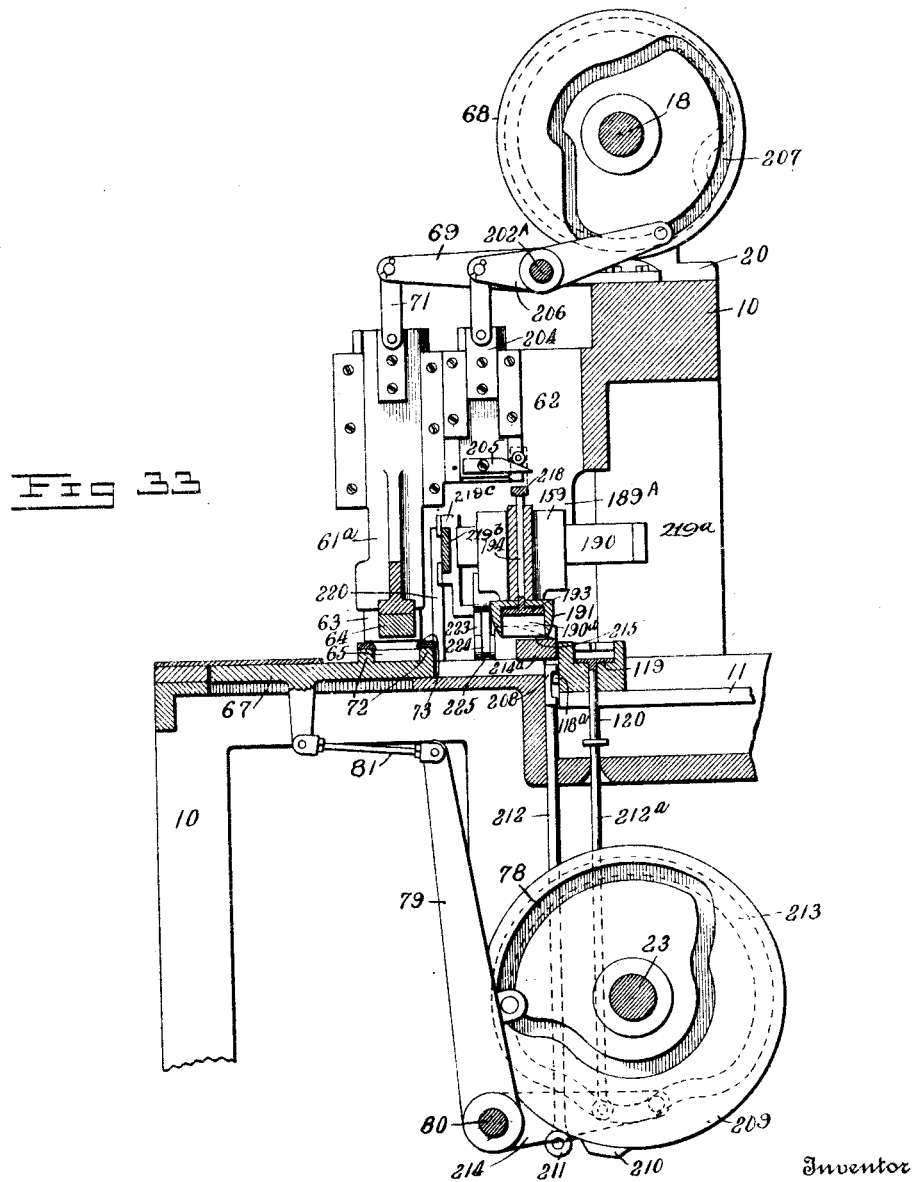
Figure 41:
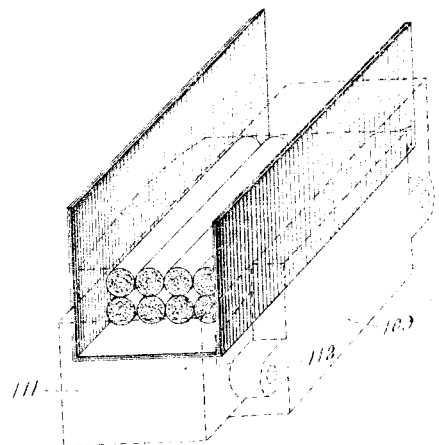
Figure 42:
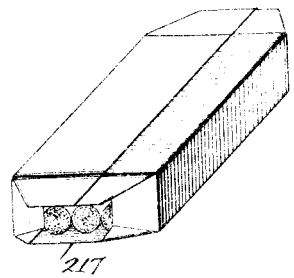
Figure 43:
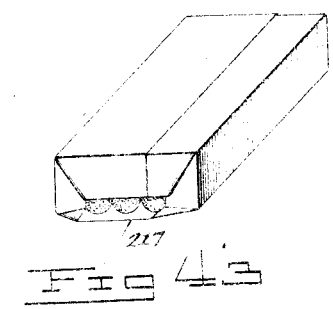
Figure 44:
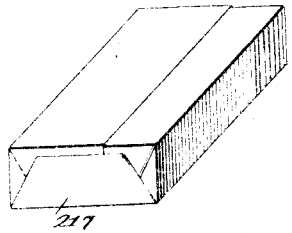

All of the mechanical features of my invention used in securing the best results, as well as the interrelation of the mechanisms above referred to and coöperation to turn out the product of the machine will be clearly understood and fully appreciated from the following description taken in connection with the accompanying sheets of drawings in which:

Figure 1 is a front elevation of the machine. Fig. 2 is a rear elevation of the same. Fig. 3 is a left hand elevation of the same. Fig. 4 is a plan view of the machine. Fig. 5 is a central sectional elevation of the cutting and printing mechanism for the slide wrappers. Fig. 6 is a plan view of the same. Fig. 7 is a side elevation of the same showing the gearing between the cutting and printing rolls. Fig. 8 is a plan view on a somewhat enlarged scale of the rear portion of the machine table showing the slide wrapper feed mechanism, the shell feed and delivery mechanisms in plan. Fig. 9 is a transverse section of the feed channel of the slide wrapper feed mechanism taken on line 9—9 of Fig. 8. Fig. 10 is a rear sectional elevation taken on line 10—10 of Fig. 4. Fig. 11 is an enlarged detail view of the slide wrapper forming pocket of Fig. 10 showing a formed wrapper in position within the pocket. Fig. 12 is a front sectional elevation taken on line 12—12 of Fig. 4, showing the cigarette counting and feeding mechanism and the foil feeding and cutting mechanism. Fig. 13 is a detail view showing the brake for the foil feeding mechanism which is applied to the end of one of the foil feed rolls. Fig. 14 is a sectional elevation taken on the line 14—14 of Figs. 1 and 4, and showing the cigarette feeding and counting mechanism and the drives of the foil feed mechanism and certain of the cam shafts. Fig. 15 is a detail of the foil feed mechanism drive. Fig. 16 is a front side elevation of the wrapping pocket. Fig. 17 is a rear side elevation of the same. Fig 18 is a plan view of the same. Fig. 19 is a central, transverse section of the same showing the transferrer plate and friction brake in position. Fig. 20 is a longitudinal section of the same showing the transferrer plate of Fig. 19 in the full line position at the bottom of the pocket, and in the dotted line position at the top of the pocket, and the end retainers of the pocket open in the dotted line position. Fig. 21 is a detail, transverse section on an enlarged scale of the counting device of the counting mechanism. Fig. 22 is a longitudinal section of the same. Fig. 23 is a view of the underside of the turret carrying the wrapping pockets and the operating mechanism therefor. Figs. 24 and 25 are elevations of portions of the wrapping mechanism showing the same in different operative positions, Fig. 24 showing one top flap and the end portions of one side of the wrapper folded over, and Fig. 25 showing the same package with both top flaps and both end portions of the sides of the wrapper tucked in. Fig. 26 is a development of the operating cams for the wrapping mechanism of Figs. 24 and 25. Fig. 27 is a partial section taken on line 27—27 of Fig. 8, and showing the operating dogs for the end retainers of the wrapping pockets at this point. Fig. 28 is a central section of the slides of the wrapping mechanism of Figs. 24 and 25. Fig. 29 is a transverse section taken on line 29—29 of Fig. 28 of one of the slides and its guide. Fig. 30 is a partial plan view of the machine table in the vicinity of the wrapping mechanism of Figs. 24 and 25, showing in addition to the wrapping mechanism in plan the guard member for holding the flaps of the packages folded after they leave the wrapping mechanism. Fig. 31 is a section of the guard member and its support taken on line 31—31 of Fig. 30. Fig. 32 is a partial transverse section of the machine taken on line 32—32 of Fig. 4 and Fig. 2 showing the package transferrer mechanism, the delivery mechanism, the slide wrapper feed mechanism and the shell feed mechanism in sectional elevation. Fig. 33 is a similar view to Fig. 32 taken on line 33—33 of Figs. 2 and 4. Fig. 34 is a sectional elevation or the transferrer mechanism and connected parts showing the transferrer in position to receive a package from a wrapping pocket carried by the turret. Fig. 35 is a similar view showing the transferrer pocket delivering a package to the slide wrapper pocket, and into the slide wrapper. Fig. 36 is an enlarged, longitudinal section of the transferrer with a wrapping pocket beneath it showing the operating dogs for the wrapping pocket. Fig. 37 is an enlarged perspective view of the compound cam lever for operating the package transferrer. Fig. 38 is a view similar to Fig. 9 taken on line 38—38 of Fig. 8, and showing in sectional elevation the boxing and delivering mechanisms. Fig. 39 is an enlarged view of the box shell in the shell magazine showing the shell still in collapsed condition. Fig. 40 is a similar sectional view showing the shell as opened by pressure of the shell transferrer slide. Fig. 41 shows an incomplete package held by the wrapping pockets shown in dotted lines. Figs. 42 to 44 show the same package in several stages of its wrapping. Figs. 45 and 46 show the slide wrapper as cut by the slide wrapper cutting mechanism and as formed by the feeding mechanism respectively, and Figs. 47 to 49 show the wrapper package of Figs. 41 to 44 placed within the slide wrapper, with the slide wrapper wrapped around it and boxed in the shell respectively.

The various mechanisms of the machine are grouped around and mounted within or upon a main body frame 10, and several of them most closely related are arranged around the centrally mounted revolving turret or transfer table 11. These mechanisms are generally designated as follows: The slide wrapper cutting and printing mechanism by 13, the slide wrapper feed mechanism by 13ᴬ, the feeding and counting mechanism for the cigarettes by 14, the foil and paper feed mechanism by 15, the wrapping mechanism by 16, and the mechanism for wrapping in the slide, placing in the shell, and delivering the completed package from the machine by 17.

The power for driving the several mechanisms is had from a main drive shaft 18 mounted in bearings 19 and 20, secured to the top of the main frame itself, and three counter or sub-shafts, to wit, 21, located vertically of the main frame 10 and connecting with the shaft 18 by bevel gears 22; a cross shaft 23 mounted in the lower part of the frame 10 parallel to the main shaft 18, and geared to the vertical shaft 21 by bevel gears 24; and the transverse shaft 25 at one end of the machine just above the shaft 23 geared to it by gears 26; and transverse shaft 25ᴬ geared directly to shaft 23. In this particular embodiment, the various parts of the mechanisms are operated in the majority of instances by cams mounted on the drive shafts. I have found that cams are especially adapted for this purpose on account of the great number of reciprocating motions necessarily present in a machine of this character. They lend themselves most admirably to an exact movement and exact timing of the various parts. To facilitate the timing of the various operations, I have so proportioned the gear connections between the several drive shafts as to have them driven at the same rotative speed.

Referring more particularly to the drawings (Figs. 5 to 6) the slide wrapper cutter and printer mechanism is mounted on a pedestal spaced apart from the main frame 10 by a suitable distance, which I prefer to make several inches for a purpose to be presently mentioned. This mechanism comprises a pair of cutting and scoring rolls, 27 and 28, and a pair of knocker rolls 29 and 30, and a pair of printing rolls 31 and 32 mounted in a frame work made up of two parallel side plates 33 and a horizontal centrally located table 34, the upper face of the table being smooth and in the same plane with the meeting surfaces of the three pairs of rolls. The rolls are geared together by gears 35 on the outside of one side plate in such a manner that the rolls of each pair revolve toward each other, and the band of paper or cardboard entering the mechanism from the side of the cutting and scoring rolls will be carried through the mechanism and successively cut, knocked, and printed. The roll of paper is supported by the pedestal 36 above the mechanism 13, and the paper is drawn from this roll and into the cutting mechanism around a guide and straightening roller 37. In some instances, I prefer to use two of these rollers, the one 37 and another 38, and pass the paper over these rollers so that it is bent reversely from the bend given it by the paper roll around roller 37 and thus straightened before it reaches the wrapping mechanism. The cutting and scoring roller acts both to cut the slide wrapper to the proper shape and to score it so that it may be more easily formed in the right shape and wrapped around the package. The knocker rolls, 29 and 30, act merely to knock out from the body of the band the portions which have been cut away by the cutting rollers. The printing rolls stamp the cut wrappers in any desired manner. An inking roller 39 of an inking device, 40, keeps the upper printing roll, 31, which is the type roll, supplied with ink. This mechanism is driven from the cross shaft, 25, by means of a sprocket chain 41 and suitable sprockets. As thus driven, the mechanism operates continuously to cut and print wrappers in a continuous band form, as shown in Fig. 4, and at a rate of speed sufficient to supply the demands of the machine. For convenience of hand operation, a hand wheel, 42, is provided on one end of the spindle of idler gear 30', while a sprocket on the other end of the idler gear is connected to it through the medium of a ratchet clutch 42$^a$ of a form to be presently described, and which is used in connection with the foil and paper feed mechanism as well. The slide wrappers, as thus formed in a continuous band, are fed to the wrapping machine by the feeding mechanism 13$^A$.

A table 43, at a convenient height for operators, is supported by the body frame 10, and on this table slightly elevated with respect to it and in line with the cutting and printing mechanism, is a feed trough or channel 44 extending from the end of the table away from the cutting and printing mechanism approximately to its middle. An intermittently operating reciprocating feed device feeds the band of slide wrappers forward one wrapper length at a time. A number of cams are mounted on transverse shaft 25$^A$ and of these one, 45, operates a lever 46, pivoted along with several other levers (also operated by the cams) on a short shaft 47 supported by arms below the shaft 25. A roller 49 runs in a cam slot 50 of the cam 45 (see Fig. 2) and the lever is intermittently oscillated as the cam rotates. The top end of the lever projects through an opening 51 in the table of the machine immediately along side of the channel 44 and by means of a link 52 is connected to a slide 53 mounted on a guide bar 54 supported from the side of the channel. Hinged to the slide 53 with one end resting on the bottom of the channel in a groove 53$^A$, is a gravity operated detent 55 having a downwardly projecting hooked end 56 for engaging the cutaway portion of the slide wrapper band and carrying it forward at each reciprocation of the slide. The channel has a cross section, such as shown in Fig. 9. Secured to or formed integral with the side walls are overhanging guard members 56$^a$, which confine the edges of the slide wrappers to the bottom of the channel and prevent buckling of any sort. Extending longitudinally of the channel and pressing close upon the center of the band is a guard bar 57, supported by brackets 58 from the side of the channel, and whose office is to keep the center of the band from buckling, pressing it close down upon the bottom of the channel. A stationary gravity operated detent, 58$^a$, is pivoted at one side of the channel and extends in a direction to prevent backward movement of the band by engaging the cutaway portions of the band.

From the above description, the operation of feeding the slide wrappers may be followed. The reciprocation of the slide 53 is so timed by the shaping of the surface of cam 45 that the detent 55 engages the wrapper band at the cutaway side portion and draws it forward one wrapper length at the proper time for the reception of a wrapper by a forming and transfer device next to be described. The band is held in this position by the stationary pawl 58ª. The position of both the reciprocating pawl 55 and the stationary pawl 58ª is adjustable by means of slots 59 and screws 60 associated with their upper supports in order that an accurate, as well as a positive movement, may be had. Having in view the intermittent movement of the band by the feeding mechanism, the purpose of the space between the cutting and printing mechanism and the main body of the machine is apparent. There must be enough slack in the band between the two mechanisms to admit of the intermittent feed without tightening or stretching the band, otherwise the breakage of the band would result which would interfere with the continuous operation of the machine, or else the band would be stretched and the accurate adjustment of the parts of the machine interfered with. The cutting and printing mechanism is positively geared by the sprocket chain 31 to the drive shaft to feed at a rate of speed exactly sufficient to supply the machine. The wrapper band is moved at the same mean lineal speed as it passes through the machine. I prefer to give slack to the band in the form of a loop, as shown in Fig. 1. Curved guards 61, extending from the end of the channel, prevent undesired creasing and bending of the band as it passes backwardly from the loop into the channel. This form of looping enables me to print on top of the band, allows time for the print to dry, and saves space.

A vertically reciprocating plunger 61ª is slidably mounted on a bracket 62, extending rearwardly from the upper part of the main frame 10 and over the line of the feed channel 44. This plunger carries at its end a knife 63 for cutting slide wrappers from the band, and in advance of the knife a forming head 64 which coöperates with a forming pocket 65 to form the cut wrappers into suitable form for the reception of the cigarettes. The knife 63 cuts vertically through the band, and is accommodated by a transverse slot 66 in the bed of the feed channel near the delivery end. The pocket 65, coöperating with the forming head 64, is carried by a reciprocating transfer slide 67 located immediately adjacent to the end of the feed channel, and having a line of movement at right angles thereto. At the outer limits of its travel, the pocket is in position to receive the forming head 64 of the plunger. An unsevered wrapper is positioned immediately over the pocket and below the plunger by the slide wrapper feeding mechanism, and the downward movement of the plunger 61ª is timed to occur just at this juncture, the plunger being driven by a cam 68 from the main shaft 18, having surfaces designed for this purpose. A rocking lever 69, provided at one end with a cam roller 70 and linked at the other end by a member 71 to the plunger, transmits motion from the cam to the plunger, said rock lever being pivoted intermediate its ends on the short fixed shaft 202ᴬ shown in Fig. 32 to be supported from the main frame 10.

The forming pocket is made up of two side walls, 72, directly affixed to the reciprocating transfer slide. The top plates or integral extensions, 73, are provided on these side walls for the purpose of holding within the pocket the shaped wrapper, as shown in Fig. 11, the edges of the shaped wrapper swinging out and catching underneath the overhanging edges as the wrapper is pushed down into the pocket. End forming members, 74, of convex shape are located one on each side of the transfer slide in line with the feed channel, 44. The forming head 64 is recessed or cut away concavely, as at 75, to coöperate with the end forming members 74 to sharply bend each of the end wrappers as they are forced down. This shaping of the forming members 74 and of the forming head 64 insures a rapid movement of the plunger without undesirable sticking or clogging of the parts. On the side of the slide transfer away from the channel 44 are a pair of guide studs or pins, 76, fixed to the end turning member 74 on that side and spaced apart a distance equal to the width of the end flap of wrapper. These pins serve to accurately aline the wrapper when it is positioned over the forming pocket, and as the opposite end of the wrapper is still within the channel, all displacement of the wrapper other than that necessary for its shaping is prevented and each wrapper is accurately formed. As a precaution against accidental buckling, an overhanging guard member 77 is affixed to the table and extends to a point midway between the two guard studs, 76, where it engages the end flap of the slide wrapper during the forming operation. This latter guard is of use principally when the paper fed to the machine is warped or otherwise bent and has a tendency to rise up at the free end, although the machine operates satisfactorily without it when the paper is straight.

The slide wrapper transfer slide which carries the forming pocket, is intermittently reciprocated from the lower cam shaft 23. Cam 78 actuates intermittently the rock lever 79, which is pivoted on the rock lever shaft 80 mounted in the frame somewhat below and parallel to the cam shaft 23. The upper end of the rock lever is connected to the transfer slide by connecting rod 81, and the slide periodically positions the pocket to receive the wrapper to be formed by forming head 64, and then transfers the formed wrapper which the pocket contains to a point near to turret 11 from which the package, formed by other parts of the machine, is delivered to the slide wrapper. Adjacent the end of channel 44 are two cam blocks 82, one on each side of the path of movement of the transfer slide and in position to turn up to a nearly vertical position the end flaps of the wrapper which have been previously turned part way up and crimped in that position by the end forming members and surfaces 74 and 75. Cam blocks 82 have their inner walls formed with a gradually decreasing bevel from the front end next to channel 44, the rear end away from it. The slide wrapper is now in a position to receive the cigarettes as delivered to it from the turret. These cigarettes are delivered from the turret with the paper and foil already wrapped around them, and thus they are in the form of partially complete packages, complete so far as their being enveloped in the inner wrapper is concerned, but incomplete so far as the outer wrapper is concerned.

The cigarette counting and feeding mechanism 14 and the paper foil feed mechanism are located on one side of the machine toward the slide wrapper cutting mechanism and toward the front, being directly in line with the longitudinal diameter of the revolving turret 11.

The frame of the cigarette feeding and counting mechanism is supported from the main frame 10 by a bracket 84. Its main body 85 is horizontal, and has depending therefrom toward turret 11 a leg part 86. A hopper 87 is mounted on the upper portion of this frame. Within it are mounted the two rolls 88 and 88ª, supporting an endless carrier belt 89 immediately below the hopper, the upper part of the main body frame being smoothly machined, and the carrier belt passing over it. An agitator wheel 90, mounted just above the carrier belt in one corner of the hopper bottom is driven in a direction reverse to that of the revolution of the carrier belt by a band 91 passing over pulleys on the agitator wheel and the spindle of roll 88ª respectively. A guard or shield plate 92 is attached to one end wall of the hopper, and extends down nearly into contact with the surface of the agitator roll 90. It prevents the cigarettes from being carried down and mashed between the agitator and the end wall. The agitator roll is provided with longitudinal grooves in its upper surface. These grooves catch the cigarettes and carry them back into the hopper when too great a number tend to pass out on the carrier belt. In the depending leg portion, 86, of the frame is formed a chute 93 which receives the cigarettes from the carrier belt. This chute is open on the top, parallel retaining strips 94 being secured to each side wall of the chute to hold the cigarettes in column form within the chute, the chute being just deep enough to accommodate the cigarettes one deep and just wide enough to accommodate the cigarettes of a predetermined length. The carrier belt is driven from cam shaft 25 mounted in the lower part of the machine, and geared to cam shaft 25ª, by a sprocket chain 96 and suitable sprockets. Moving in the direction shown by arrows in Fig. 12, the carrier belt delivers the cigarettes to the chute transversely one at a time and one deep, there being just space enough between the agitator wheel 90 and the carrier belt at the point of entry to the chute to accommodate one cigarette in this position. The agitater wheel 90 rotating oppositely carries the cigarettes in excess of the capacity of the chute back up into the hopper. Thus there is a continual feeding to the chute in one direction by the carrier belt and agitation in the reverse direction by the agitator wheel, the chute being kept clear and a most efficient feeding operation being had. One end roller 88ª is mounted in adjustable journals for the adjustment of the carrier belt, while the other is provided with a hand wheel 96ª for hand operation. A ratchet clutch 94ᴬ is provided on the counter shaft 94ᵇ in connection with the sprocket drive 96 for this purpose. A table, 84ª, extends outwardly from the bottom of the body frame 85 for the convenient support of cigarettes, and it has a raised edge to prevent crumbs or other loose produce from falling to the floor or into the foil feed below. The hopper is provided with a hinged wall 98 so that the cigarettes may be conveniently arranged within the hopper with ease, the front wall being simply swung back on its hinges for this purpose.

At the foot of the chute leading from the hopper, is the counting mechanism proper, which consists of a rectangular frame piece 98ª positioned horizontally and bolted to the end of the chute, and the counter transfer plunger 99, mounted vertically above it in a bracket 100, extending outwardly from the upper part of the main frame stand. This counter frame is provided with a hinged flap 101, at each end, as shown in Fig. 22, the flaps projecting a little distance inwardly of the frame and being biased inwardly by light springs, 102, (see Fig. 22) so that they may be moved downwardly and outwardly by light pressure. The counter frame is of dimensions approximately suitable to accommodate the number of cigarettes desired; in this particular case 5. On the side opposite the mouth of the chute, an adjusting plate 103 is provided, set screws 104, which are screw threaded into the outer wall of the frame, being provided for moving it. In this way the counter may be adjusted to accommodate accurately cigarettes of slightly varied dimensions. The cigarettes are delivered from the mouth of the chute to this counter until it is filled, the cigarettes being supported at their ends by the end flaps or retainers, 101.

Transfer plunger 99 is provided with a head, 104ª, and is vertical and intermittently reciprocable by means of a cam 105 mounted on the main cam shaft, and connected to its upper end by means of bell crank 107 and connecting link 108. When the plunger moves downwardly the cigarettes are forced from the counter into a wrapping pocket 109, positioned immediately below it by the revolving turret or table. The wrapping pocket is one of a plurality of pockets (in this case 8) carried by the revolving turret 11. It consists of a substantially rectangular main body of sturdy proportions provided with a longitudinal slot 110 in its top, and two hinged pocket retainers 111, one at each end of the pocket, adapted to close the corresponding open end of the slot. The rectangular recess or cavity formed by the side walls of the slot and the pocket retainers 111, is the actual pocket which receives the cigarettes from the counter, though I prefer to call the whole structure a wrapping pocket. The pocket retainers, 111, are pivoted to the main body at 112, are undercut at 113 and provided with an integral extension 114 toward the main body. Coupled with this extension is a link, 115, extending into a cavity, 116, in the body of the structure and engaging a spring pressed plunger 116ª, housed within the cavity and at all times pressing outwardly upon the link 115. It will be observed by virtue of the position of the projection 114 with relation to the position of the spring, that the pocket retainers will be held in either open position, as shown in dotted lines in Fig. 20, or closed position as shown in full lines in Fig. 20, according as the point of attachment of the link 115 to the projection 114 is to one side or the other of the line joining the axis of the spring to the pivotal point 112 of the pocket retainer. Adjustable stops 117 on the main body engaging pins 118 on the pocket retainers limit the inward movement of the retainers in their closed position. Pins 118ª on the opposite side of the retainers extend outwardly a sufficient distance for engagement by operating dogs projecting upwardly alongside of the table opposite the cigarette feeding mechanism just in the right position to engage pins when table 11 stops with the wrapping pocket in that position. Reciprocable from the bottom to the top of the slot 110 is a pocket transfer plate 119 supported by a rod 120 passing centrally and vertically through the body of the wrapping pocket and through the turret 11 where it is engaged at certain times by suitably arranged plungers which effect its reciprocation and correspondingly move the plate 119.

Housed in the body of the wrapping pocket and bearing directly on the rod 120 is a friction plunger 121 spring pressed into engagement with rod 120 by a spring 122 confined to the cavity in which the plunger is located and pressed against the plunger by a screw 123 operable from without the body. The transfer plate thus is held in any position to which it may be moved.

Arranged alongside the turret to close the end retainers at the point opposite the feeding mechanism are a pair of dogs 124 mounted on the end of a slide 125 and connected by link 126 to a rocking lever 127 mounted on the rock lever shaft 80 and operated by a cam 126ª on cam shaft 23 in the lower part of the machine. The rocking lever 127 is held in engagement with the cam 126ª by a biasing spring 127ª. Dogs 124 are spaced apart and located one immediately below the point occupied by each pin projecting from the pocket retainers when the pocket is in position before the feeding mechanism.

Before the transfer of cigarettes from the counting device to the wrapping pocket takes place, a sheet of wrapping material is fed between the counting device and the pocket below it, being so positioned that when the cigarettes are forced into the pocket the wrapping material is carried with them into the pocket and surrounds them; the first act of wrapping being thus done directly by the transfer of the cigarettes to the wrapping pocket. This wrapping material in this particular machine is paper and tin foil, an inner wrapping of paper and an outer wrapping of foil being made use of, the office of the paper being principally to strengthen the foil so that it may be used with facility without tearing or crinkling. The paper feeding mechanism 15 is located immediately below and in the same plane with the cigarette feeding mechanism just described. A horizontal feed table 127ᵇ is located in a plane passing between the bottom of the counting device and the top of the wrapping pockets on the turret 11. The foil and paper are fed together over this table and into position over the wrapping pockets by a pair of feed rollers 128, the top one of which is rubber faced and adjustably spring pressed toward the bottom one. The rolls draw the paper from the reel 129 on which the foil and fiber paper are wound together, the bands being slightly glued together to keep the foil and paper together when wrappers are made from it. The feed rollers 128 are geared together and are intermittently operated by a cam 129ª on shaft 25 acting through the medium of a pawl and ratchet. A pawl 130 is operated by an arm 131 pivoted at one end to the frame of the machine and engaged at the other by the cam, and this pawl actuates intermittently a ratchet 132 connected directly with the cog gear 133 mounted loosely on shaft 25 and geared to the rolls 128. The surface 133ª of the cam 129ª is so shaped that the paper feeding rolls are actuated once each time a wrapping pocket is brought by the turret into position to be filled, and through the ratchet to feed the paper forward just the right distance to form a wrapper the proper length. As shown, the shape of the cam surface 133ª is such that the ratchet is actuated through a rocking of the arm 131 once each revolution of the shaft 25, which it will be observed, is geared directly to the cam shaft 25ᴬ so that it rotates at the same speed. A friction plunger 134 housed within the side wall 135 of the frame of the mechanism at 136, as shown in Figs. 1 and 13 is spring pressed against the end of the lower feed roller 128. This serves to stop or brake the mechanism when the ratchet is disengaged and thus insures the wrappers being all the same length.

A hand wheel 136ᴬ, is provided for the movement of the paper feeding mechanism by hand, a ratchet clutch 136ᴮ being provided on the shaft for this purpose, the shaft being made of two concentric members, 136ᶜ and 136ᴰ, and the pawl of the ratchet being attached to the one member and the ratchet to the other member. Similar clutch devices are used in other parts of the machine, and it is evident that any device of this character which will permit a mechanism to be operated by hand independently of the other associated mechanisms may be used, if desired.

The reel carrying the paper is supported on the shaft 137 supported by a bracket 138, one end of the shaft being journaled in a side split bearing equipped with a clamping screw 139 engaging the bearing on the opposite sides of the split whereby the bearing may be made to clamp the shaft more or less tightly and more or less resistance to the rotation of the reel introduced. This enables one to regulate the tension of the paper and foil so that the paper may not be torn, and at the same time so that undesirable slack may not be introduced during the intermittent movement of the feed mechanism. Slack is undesirable, because the paper and foil may crinkle or crease between the feed rollers and cause trouble. A smoothing plate, 140 is placed on the paper to the left of the feed rolls 128 and behind an end knife bar 141 underneath which the paper passes, for the purpose of preventing buckling of the paper as it passes over the table. A guide and supporting plate 142 projects from the table beneath the paper in advance of the guard bar 141, while a guard 143 is located on the opposite side of the counting device, and above the wrapping paper. By these devices the paper is projected into position over the wrapping pocket just as the feeding operation is complete. A knife or shear blade 144, which is pivoted at 145, to one side of and below the table 127, is actuated by a surface 146 on cam 129ª to cut the paper off just at the guard bar 141. Cam surface 146 actuates the knife by acting on one end of the bell crank lever pivoted at 147 on an extension 148 from the main frame, and connected at its other end by a link 149 to the knife 144. To further the cutting and secure a shearing action, the outer edge of the guard bar 141 is tempered and sharpened to coöperate with the knife 144, the edge of which bears directly upon it and the paper being cut between them.

When the wrapping pockets are brought by the turret beneath the counting device, the pocket retainers 111 are open, as shown in Fig. 20, and the pocket transfer plate is raised, as shown in Fig. 20 in dotted lines. The counting device being filled with cigarettes supported by the end flaps, as the wrapping pocket approaches its position (the table revolving in the direction shown by arrow as will be presently seen) the wrapping material is fed forward by the mechanism 15, and when the pocket reaches its position and stops the paper has been fed forward and cut off, as will readily appear by noting the relative arrangement of the cam surfaces 129 and 146, in connection with the turret turning gear presently to be described. The paper is supported by pocket transfer or bottom plate 119, and the supporting plate 142 on the end of the table 127. Just at this juncture, the cam 105 actuates plunger 99 of the counting device down and back with a quick movement. The cigarettes in the counter are forced into the pocket shoving the plate 119 downward to the bottom of the pocket and carrying the wrapping paper with and beneath them. There is a short but brief rest for the transfer plunger 99 (as will be seen by referring to Fig. 14, which shows the shape of its cam) when it is again quickly moved down and back transferring another charge of counted cigarettes to the wrapping pocket. Immediately and just before the plunger recedes the dogs 124 close the end retainers 111 by a quick upward movement against the pins. The cigarettes are thus held in place by the retainer. The turret then moves on with the filled wrapping pocket. See Fig. 41. The end retainers are held in closed position by the springs and links 115 and 116. It will be observed that the cutaway portion 113 is for the accommodation of the end of the wrapper which projects beyond the bed of the pocket and is supported by the bottom plate 119, which is made considerably longer than the pocket proper for this purpose. In order that the movement of these plates 119, to the bottom of the pocket may be insured without depending wholly upon the pressure of the plunger through the cigarettes, a crosshead 150 is attached to the transfer plunger rod and extends longitudinally across the top of the counting device. At its upper end it carries two downwardly projecting pins 151 which pass through the end walls of the counting device frame and are adapted to engage the plates 119 and force them down in case too great pressure is brought upon the cigarettes for this purpose. The pins are not long enough to engage the plates 119 before the cigarettes, which are being forced into the pocket by the transfer plunger, so that normally the plates 119 are forced down to the bottom of the pocket by pressure on the cigarettes, thus insuring a firm and compact packing. But they are long enough to force the plate down before too much compression of the cigarettes is caused by undue resistance to the movement of the plate, thus preventing the cigarettes from being unduly mashed or torn. The crosshead carrying these pins is adjustable by set screw 152, as shown. I have found that when this pocketing operation takes place, in case there is a spring to the cigarettes due to their being very dry or from other causes, they have a tendency to buckle up in the middle after the counter transfer plunger returns to normal position. This is particularly the case when a flat engaging surface is used on the plunger head. I find that the use of a laterally convex plunger engaging surface 153, as shown in Fig. 12, effectively obviates this difficulty, the central cigarettes of the package which have the greater tendency to buckle up, being the more firmly pressed down to the bottom of the pocket between the others. I prefer to form the plunger head of the shape shown in this Fig. 12, forming with it a dividing wall 154 whose office is to stop the mouth of the chute during the downward movement of the plunger. I have also found in the use of this counting device that there is an inaccuracy of the counting device and also clogging of the counting device and chute, due to the pressure brought to bear on the cigarettes in the chute by the continuous movement of the carrier belt 89. I have devised an efficient gravity feed for the cigarettes, the effective height of the cigarettes in the column being maintained approximately constant. I use a regulator finger 155 in the shape of a sheet metal spring fastened at one end to a bracket 156 projecting from the frame, and being rounded and adapted to bear at the other end upon the column of cigarettes in the chute. An arm 157 is adjustably attached to the transfer plunger rod 99 and in the uppermost position of the plunger rod bears with its end against the finger 155 and causes it to engage the cigarettes and break the column by stopping the passage of cigarettes down the chute. The counting device thus fills with cigarettes which are moved down the chute by gravity and the pressure on which depends solely upon the height of the column from the counting device to the finger 155. When the transfer plunger 99 moves on a downward transfer stroke the finger 155 is released and releases the cigarettes held back in the upper part of the chute. They thus move down and fill up the column while the counting device is shut off. Immediately upon the return of the transfer plunger to its upper position, the column is again broken and the counting device filled by gravity.

Diametrically opposite the counting device and feeding mechanism is a folding mechanism 16, which laps the top of the wrapper and tucks in the right and left side portions of each end to form the top and bottom flaps, while to the rear of the revolving turret and 90° from the folding and feeding mechanisms is a transfer device 159 which transfers the packages from the wrapping pockets to the outside slide wrapper. The gearing for turning and positioning the revolving turret, on account of the relative position of these mechanisms and devices and on account of the particular requirements of intermittent motion, is of a particular character. The table is journaled on a trunnion 160 in a bearing 161 depending from the underside of the middle part of the main frame. The underside of the turret or table is formed as shown in Fig. 23 for engagement by the actuating crank 162 and the locking segment 163 mounted on vertical shaft 21 just at the bottom of the table. Eight U-shaped engagement surfaces are radially equally distant from each other around the underside of the table. A roller 165 on the end of the crank 162 engages one of these surfaces at each revolution of the shaft, and turns the turret through one-eighth of a revolution. Midway between each pair of these surfaces is located a circular locking recess 166 for the accommodation of the locking segment 163. The engagement surfaces with relation to the movement of the crank 162 and the locking segment 163 are so located as to lock the turret in position just prior to or immediately upon the withdrawal of the crank from an actuating surface with which it is engaged. The crank on the vertical shaft is positioned approximately 45° from the feeding and counting mechanism. The revolving turret is thus intermittently rotated one-eighth of a revolution at stated intervals, and presents the wrapping pockets successively to the several mechanisms grouped around it, holding them before the mechanisms long enough for the mechanisms to perform their several operations upon the package.

Referring to Figs. 25 and 30, 167 and 168, are two reciprocating slide folding devices. Each of these reciprocates in a guideway 169 supported from the top of the main frame by a bracket 170. Rocking levers pivoted at 171 on the upper ends of these brackets and bearing upon cam surfaces 172 and 173 in the periphery of a cam drum on the main shaft 18 at their upper ends, connect with the folding slides by links 174. The slides are thus reciprocated by the cam drum. Each slide carries a lapping plate 175 bolted to its top and is provided with two tuckers 176 one on each side. the end of the plate and the tuckers projecting beyond the slides toward each other, and the plates projecting somewhat beyond the tuckers. It will be observed that in due course one of the wrapping pockets is positioned by the turret between the folding slides and directly in line with them, one of the slides overhanging the turret and the other overhanging the frame just beyond the border of the turret. Just as the slide is positioned here, the parts occupy the position shown in Fig. 2, the upper ends 177 of the rocking levers engaging the cam surfaces at the points A shown in Fig. 26 delineating the cam surfaces in developed form. The motion of the surfaces is in the direction shown by the arrow. Just as the wrapping pocket reaches a standstill, the inner slide starts forward, the edge of its top lapping plate engaging the flap of the wrapper on that side and turning it down. Just before the tuckers on that slide reach the end retainers of the wrapping pocket. and after the lapping plate has been positioned over the top of the pocket the dogs 178 located beside the turret at this point have imparted to them a downward movement by cam 179, acting on rocking lever 180, link 181, and slide 182. The upper jaw 183 of the dogs engages the projecting pins 118ª on the end retainers and trip them to open position, as shown in Fig. 20. The tuckers following close upon this movement, tuck in the side portions of the end of the wrapper, as shown in Fig. 24 and in Fig. 42 which depicts a partially completed package at this stage. Just before this slide 169 reaches its extreme lefthand movement and before it starts on the return movement the lefthand slide 167 starts forward (see Figs. 25 and 26). It engages lefthand flap and following the receding right hand slide 168 laps the lefthand flap of the wrapper over the righthand flap, and proceeding farther tucks the lefthand portions of the end of the wrapper in the same manner as the righthand portions were tucked in. This accomplished, it immediately recedes, and as soon as the ends of the tuckers are clear of the pocket retainers, and before the top lapping plate is removed, dogs 178 have an upward movement imparted to them by cam 179 engaging the pins 118 on the pocket retainers by their lower jaws 184, tripping them to the closed position, in which position they hold tight the tucked ends of the wrapper. See Fig. 27.

The lapping plates 176 have edges smoothly beveled on the underside in order to avoid damaging the wrapping material (which happens to be in this case foil which is very delicate) and the plate on the right hand slide or the one which first acts on the package is beveled less than the left hand. I find that this insures a more rapid, efficient and accurate lapping of the top flaps of the package. The end tuckers 170 have their ends slightly tapering in form and the corners slightly rounded to prevent their damaging the thin foil or other wrapping material. Both the lapping plates and the tuckers are adjustable with respect to the slide. The rocking levers 177 are made in two parts angularly adjustable with respect to each other at their pivotal ends 171 in such a manner that the movement of the slides is independently adjustable. For use in cases where light paper is used, a guard 185 is bolted to the righthand slide and extends outwardly from the slide parallel to the path of movement of the wrapping pockets at this point and is provided with an engaging arm 186 adapted to engage the inner top flap of the wrapper and turn it slightly over so that the wrapper will approach the inner lapping side in proper position to be folded over and will not become crumpled or bent just before or during the folding operation.

Passed beyond the folding mechanism upon the next movement of the turret, the package is engaged by the foil plate or circular form hinged to the frame of the machine at the side of the turret before the top lapping plate has been completely removed. This foil plate acts as a guard to hold the upper flaps of the foil wrapper in folded position. The plate is curved to conform to the central path of the packages, is preferably made of brass, and is provided with means of adjustment of its height and pressure on the flaps or the packages by means of a set screw 188 engaging an abutment 189 on the frame. I find that brass does not stick to the foil as do some other metals which I have tried. A brass foil plate smoothly finished on its underside offers but little frictional resistance to the movement of the foil wrapped packages beneath it and wears off so little of the foil as to effectually prevent sticking of the folded flaps and the tearing of the foil during the movement of the packages beneath it. The wrapping pockets having passed the folding mechanism arrive at the second following movement of the turret, beneath the transfer device which is adapted to finish the wrapping of the package in the foil and paper and deposit it in the outer or slide wrapper, which is moved into position to receive it by the slide wrapper transfer slide previously described. This transfer, which is designated by 159, generally, is made up of a main body casting slidably mounted on a horizontal transversely extending guide 190 secured to depending arm 189^A of the bracket 62 extending rearwardly from the upper part of the frame 10, this being the same bracket which supports the slide wrapper forming plunger. On the bottom of the transfer slide is a transfer pocket 190^a. This pocket is made up of two depending side walls 191 fixed in position and tapering slightly to a somewhat sharp bottom edge, and two hinged end walls 192 capable of outward movement, are spring pressed inwardly, normally occupying a substantially vertical position and forming with the side walls, the transfer pocket. Like the side walls, they are slightly tapered from top to bottom. The bottom edges are rounded in order to prevent damage to the wrapper of the package. The reciprocable transfer plate 193 is mounted on a rod 194 extending vertically through the slide and positioning the plate within the pocket, the rod being of such dimensions as to permit the plate to reciprocate from the top to the bottom of the pocket. A friction plunger 195 is spring pressed into engagement with the rod as shown in Fig. 36 opposing the movement of the rod slightly and operating it to hold it in all positions to which it is moved. Set screws 196 enter the pocket from the top and bear against lugs on the end walls 192, thus enabling the effective length of the pocket to be adjusted. The transfer as thus embodied is reciprocable on the guide 190 by a compound rocking lever 197 pivoted to the same shaft to which the rock lever 69 actuating the slide wrapper plunger is pivoted. This lever is engaged at its upper end by cam surface 198 of cam 199 on the cam shaft 18 and at its lower end is connected to the slide transfer through the medium of a link 200. The compound lever 197 is made in two parts, 201 and 202, both parts being pivoted on rock lever shaft 202^A but separately from each other (see Fig. 37). Part 201 connects with the transfer, while part 202 connects with the cam. The lower end of part 202 connects with the part 201 by a T with rearwardly bent lugs formed on its lower end, the lugs confining adjustable springs between them and in sockets 203 on the part 201. Thus there is a yielding connection between the two parts of the lever. The object of this is to guard against breakage of the lever upon accidental jamming of the transfer or any of its connected parts, and to allow the pocket to be accurately positioned at each end of its travel by stops 219 and 219^a.

A reciprocating slide 204 is mounted on the same arm which carries the slide wrapping plunger 61^a, and directly over the innermost position of the slide wrapper pocket. This slide carries at its lower end a cam block 205 in the shape of a horizontal bar with its front end toward the transfer 159 beveled outwardly. Its upper end is connected to a cam lever 206 mounted on cam lever shaft 202^a and actuated by cam surface 207 on the cam disk 68, this disk also being provided with the cam surface actuating the slide wrapper forming plunger 62.

Assuming that the transfer is at its innermost position over the edge of the turret and that a wrapping pocket carrying the partially wrapped package is immediately beneath it, a transfer of the package from the wrapping pocket to the transfer pocket and to the slide wrapper pocket takes place. Immediately as the wrapping pocket is positioned beneath the transfer pocket, the pocket retainers 111 are opened by the downward movement of dogs 208 by the side of the turret and actuated in a similar manner to the pocket retainer dogs heretofore described by a cam surface 209 on the outer periphery of the same cam disk 78, which is provided with the surface actuating the slide wrapper transfer slide 67, through the medium of a cam or rocking lever. A somewhat sharp and short projection on this surface at 210 engages rocking lever 211 connecting with the dogs through rod 212 and opens the retainers suddenly. Just as the retainers fly back, the transfer plate, now at the bottom of the wrapping pocket, is actuated by a rod 212^a which projects upward from beneath the table and abuts end on against the end of the rod 120 carrying the plate. Actuated upwardly by a cam surface 213 on the opposite side of the cam disk 78 from the surface 78^a, which rocks lever 214 connected to the rod 212^a, the rod 212^a, shoves the transfer plate 119 up to the top of the wrapping pocket transferring the partially wrapped package to the transfer pocket 190. As the package goes into the transfer pocket, the hinged spring pressed end walls 192 of the pocket fold downwardly the top end flaps of the wrapper, producing the package shown in Figs. 34 and 43. The bottom end flaps are still unfolded. Because the end walls of the transfer pocket are hinged and spring pressed, they adjust themselves to slight variations in the length of a package automatically as they turn down the upper end flaps. The package completely in the transfer pocket, the transfer cam 198 acting on the transfer through the yielding lever 197, carries the transfer rapidly rearward, stopping it immediately over the slide wrapper held by the slide wrapper forming pocket 65. See Fig. 35. In its passage from the wrapping pocket to the slide wrapper pocket, the transfer has passed through a gateway comprising a cam block 214ª located between the side of the turret and the innermost position of the slide wrapper forming pocket. This block is secured directly to the table 43. Channel 215 is formed in its upper surface, the depth of the channel being such that as the transfer passes through it the bottom of the package carried by it slides over the bottom and in contact with it. The side walls of the channel are irregularly beveled decreasingly from the end next to the turret to the end next to the slide wrapper pocket becoming substantially vertical at the latter end. These cam surfaces 216 engage the bottom of the end flap 217 of the wrapper and turn it up against the outside of the transfer pocket and walls 192. See Fig. 33. The upper end 218 (which is slotted) of the rod carrying the transfer plate 193 of the transfer pocket, has been hooked over the cam block 205 on the slide 204 and as the transfer pocket reaches a standstill or immediately thereafter a downward movement of the slide 204 is caused by its cam and the transfer plate is shoved downwardly transferring the package to the open slide wrapper, which is held by the slide wrapper transfer pocket ready to receive it, the transfer pocket being held stationary by virtue of its mounting on the guide bar. In this transfer the bottom end flap is firmly pressed against the top end flap and the wrapping of the package in its inner wrapper of foil and paper is finally completed. The package is then as shown in Fig. 44. In this condition and in the slide wrapper it is ready for the boxing in the shell and delivery from the machine. The final wrapping, boxing, and delivery from the machine is done by a special mechanism closely related in its organization with the mechanisms previously described.

Running parallel with the slide wrapper feed channel 44 and above the table 43 beneath the arm 61 is a guide bar 219ᵇ supported at one end by a bracket 220 rising from the table and at the other end by one wall of the hopper 221 which carries the shells of the cigarette boxes in collapsed form, as shown in Figs. 3 and 39. This guide bar 219ᵇ carries a slide depending from which is an outwardly extending foot 223, the lower extremity of which is slotted and projects toward and centrally of the slide wrapper pocket in its innermost position. Within the slot 224 is hinged a toe 225 having a rounded end surface of some extent and capable of an extended angular movement of approximately 90° from the horizontal upwardly. This toe is biased to its lowermost horizontal position by a spring 226 connected with a rearward extension of the toe at one end and at the other end to the slide. A cam surface 227 on one side of disk 228 mounted on shaft 25ᴬ, actuates a rock lever 229 pivoted on shaft 47 and through which a link bar 229ª reciprocates the slide 219ᶜ. Directly in line with the line of reciprocation of the foot and immediately adjacent to the slide wrapper pocket at its innermost position is a shell forming magazine 230 and extending from the end of this in a straight line to the edge of the table is a delivery chute 231 formed of two parallel walls secured to the table by any suitable manner.

The shell magazine comprises a side wall 233 next to the turret and of a height sufficient to accommodate the side wall of an open shell. It is provided with an overhanging upper edge or stop plate 234 and is slotted or recessed in its middle to receive the hinged trip 235. This trip is hinged near the upper end of the slot as shown in Fig. 39, and biased to extend outwardly into the magazine, its upper surface sloping upwardly from the bottom of the magazine to a point just beneath the overhanging edge of the stop wall. A reciprocating transfer slide 236 actuated by a cam 237 on shaft 23 acting through lever 238 and link 239, is located in a guideway 240 at right angles to the magazine and delivery chute. This transfer slide operates to transfer the shells drawn from the shell hopper 221 to the shell magazine. These shells are drawn from the hopper by a slide 241 reciprocating in a line perpendicular to the transfer slide 236 and immediately beneath the hopper, the bottom of which is open, so that the shells rest on the slide 241. This slide is provided on its upper side with a thin steel selector plate 241ᴬ which is just of sufficient thickness to engage the rear edge of the bottommost shell on its backward stroke and shove it out from the bottom of the hopper and in front of the transfer slide 236. In this position, its front end projects beneath the guide plate 243 and is held down to the table by it. A stop plate 245 is dovetailed into a crossbar 246 at the bottom of the chute and is adjustable in a vertical direction to a height such that its lower edge will always engage the end of the shell above the bottommost one and prevent more than one shell at a time being drawn out by the selector plate 241ᴬ. The slide 241 is intermittently actuated by a cam surface 247 formed on the opposite side of the cam from the cam surface 227, connection being had by means of a rock lever 249 connected with the shell feed slide 241 by a link 250.

The shell transfer slide 236 is above the level of the table 43 sliding on its top, while the shell feed slide 241 moves with its top level with the top of the table. Immediately a shell is projected from the bottom of the hopper into the path of the transfer slide 236 or shortly thereafter, that slide is carried forward by its actuating mechanism, transferring the shell to the shell magazine. The forward edge of the shell (the shell being fed from the hopper in the position shown) strikes the magazine trip and rides up the trip until it is stopped by the overhanging upper edge 234 of the magazine wall. Continued movement of the transfer slide 237 opens the shell, as shown in Fig. 40, the magazine trip being forced back by the forward lower edge of the shell as it is opened. The shell in this position is held to receive the package in its slide wrapper. So as soon as this operation takes place, therefore, the slide 219$^c$ is moved forward by its actuating mechanism and into the shell. As the slide starts forward, the toe 225 is released, the foot having passed beyond the projection 127 on the table, and the end of the toe engages the long end flap 251 of the slide of the wrapper pressing it down upon the package. Folding lugs 252 located one on each side of the path of the package at the entrance to the shell magazine, fold the short end flaps 251$^a$ of the slide wrapper down and on top of the long end flap as the package is pushed by the foot 225 into the shell. The folding lugs 252 have their ends 254 on the side of approach to the package rounded and undercut on a bevel so as to effect an easy fold. The movement of the slide is continued until a completed package is pushed clear of the shell magazine and delivered into the chute. Thus the machine of my invention accomplishes the results sought to be obtained, counting and wrapping the commodity in the desired manner.

Recapitulating and tracing the operation of the machine through a complete cycle, the operation is, in brief, as follows: Simultaneously, with the revolving turret at a standstill and a wrapping pocket under the counting device, the folding mechanism and the transfer pocket, a number of operations proceed. First, two reciprocations of the counter transfer plunger take place, two charges of the counter being measured off and transferred to the wrapping pocket. This will be readily apparent from an inspection of the shape of the cam surface on cam 105 shown in Fig. 14. The cam slot of this cam has two sharp turns in it, 255 and 256, the turn 256 of which is somewhat smaller than turn 255. This means that the plunger carries the first charge of cigarettes all the way to the bottom of the pocket, while the second charge is carried to the top of the first, a less distance than the first was carried, and pressed there with a suitable packing compression. The wrapper having been fed into position prior to this charge of the wrapping pocket, is carried down with the cigarettes into the pocket, the first wrapping operation being performed, therefore, by the transfer plunger 98. The package is then in the form shown in Fig. 41. Secondly, the folding mechanism diametrically opposite the counting device is, at the same time, folding the top flaps of the package and tucking in the side portions of the end wrapper. This mechanism acting as described, gives the package the form shown in Fig. 42. The transfer plate 119 of the pocket, which supports the end portions of the wrapper, does not interfere with the operation of the tuckers, as it has been positively pressed down far enough into the pocket by the pins 151. Thirdly, the package as wrapped by the folding mechanisms is being transferred from the wrapping pocket to the transfer pocket and to the slide wrapper ready to receive it, by the package transfer 189, transfer plate 119 of the wrapping pocket being forced upwardly on the bottom of the pocket to place the package in the transfer pocket 190, and the transfer plate 193 being forced downwardly when the transfer has reached a position over the slide wrapper pocket to place the package in its inner wrapping into the outer slide wrapper. The package as it is placed in the slide wrapper, the inner wrapping being completed, is shown in Figs. 43 and 44. The transfer plate 193 having been moved downwardly to the mouth of the pocket for the placing of the package in the slide wrapper, is held there by friction plunger 195, as the transfer 189 is moved back by its cam and connecting levers to receive another package. The plate 193 opposes the entrance of a package to the pocket from the wrapping pocket with just sufficient resistance to insure the wrapping being held tightly on the package, and to keep the package compact. Likewise transfer plate 119, of the wrapping pockets, which is forced up to the mouth of the wrapping pockets at this point, remains there until it is forced down by the placing of the cigarettes into the pocket by the transfer plunger 98, assisting in the making in the pocket of an orderly package. In addition to this, the transfer plate 119 acts as a support for the wrapper which is positioned over it by the wrapping feed mechanism. The end retainers 111, opened upon the transfer of a package from a wrapping pocket to the transfer pocket, remain open until closed at the feeding mechanism after a charge has been placed into the pocket. Fourthly, simultaneously with these operations, a slide wrapper previously formed in the forming pocket 65 is carried from its position at the mouth of the feed channel 44 where it is formed in the pocket to the position near the side of the turret where it receives the package. The formation of the slide wrapper is illustrated in Fig. 45 and Fig. 46, Fig. 45 showing the slide in band form as cut by the cutting mechanism (which operates continuously) and Fig. 46 showing the slide wrapper as it is formed by the forming head 66 acting in the forming pocket 65, the wrapper having been severed from the band. Fifthly, a shell shoved out from the bottom of the hopper by the slide 241 is carried by the slide 236 into the shell magazine and positioned to receive the wrapped package from the slide wrapper pocket. These operations being complete, rotating turret 11 is carried by its gearing through a portion of a turn to present the next successive wrapping pockets in order to the respective mechanisms grouped around it. During this movement, the following several operations take place: First, a wrapper is fed forward between the counting device and the wrapping pocket approaching it in position to be used. This wrapper is cut off just about the time the wrapping pocket comes to a standstill beneath the counting device. Secondly, the slide wrapper band is fed forward in the channel 44 by the reciprocating feeding mechanism to present a wrapper to be formed to the forming pocket 65, which has previously returned to this position. Thirdly, a shell has been fed from the bottom of the shell hopper by the slide 241 into the path of movement of the shell transfer slide 236, which at this time, is at the end of its backward stroke. Fourthly, the package with its inner wrapping and in the slide wrapper is wrapped in the slide and forced into the shell and out upon the delivery chute by the reciprocating foot, 223, this operation commencing somewhat prior to the movement of the rotating turret 11 and just after the package transfer 189 has deposited the package in the slide wrapper and moved out of the way, the foot passing centrally through the forming pocket 65 and through the magazine, 230, and the forming pocket returning to its wrapper receiving position at the mouth of the channel 44 before the foot returns to the end of its backward stroke.

The timing of the operations as described is only approximate, their exact sequence and relation to each other being accurately timed by the various cams, whose surfaces may be shaped at will, and the exact nature of which in this particular machine, it is thought unnecessary to describe. Their approximate shape is defined in the drawings and a close observation of them will enable the operation of the machine to be followed closely.

My machine is thus organized and constructed to pack cigarettes very rapidly and very efficiently, and packs them in foil. While the machine is particularly designed for packing this commodity and for packing it in foil, it is of course obvious that it may be used for packaging other commodities in wrappers other than foil. The packaging in foil is a refinement in packaging, and this means that the nice features of my invention will render possible the production of most excellent packages wrapped in paper or other material, the package produced being extremely neat and produced very rapidly. It is also evident that many commodities other than cigarettes may be packed, such commodities being packed by the machine in a more or less efficient manner depending upon the nature of the commodity.

Quite a feature of the machine of my invention, it will now be noted, is present in the grouping and interrelation of the respective mechanisms with respect to each other and with respect to the frame of the machine. The central main frame and table support all the mechanisms. The revolving turret is supported on one side of and centrally of said main frame about the level of the table. The commodity feeding and wrapper feeding mechanisms as well as the folding mechanism are grouped about the turret and secured to one side of the main frame. Grouped close together on the table at the other side of the main frame are the slide wrapper feeding mechanism, the shell feed and the delivery mechanism, while connecting the mechanisms on opposite sides of the frame and operating to transfer packages from those on one side of the frame to those on the other is the package transfer. The slide wrapper feed operates on a line with and in conjunction with the package transfer, the slide wrapper feed on a line perpendicular to this line, the delivery mechanism also on a line perpendicular to this line and intersecting it at a point between the slide wrapper feed and the turret, while the shell feed and the shell transfer operate on lines parallel to and perpendicular to the delivery chute respectively, the shell transfer terminating in the shell magazine in the delivery chute. This organization is compact. Every mechanism can be reached with ease by the operator sitting at the front of the machine. The organization is efficient. A close association of the mechanisms renders possible a closer interrelation of the mechanisms and a more rapid transfer of packages, the movements of the mechanisms being quicker and shorter. In addition to accessibility to the operator and efficiency of coöperation, the organization has the decided advantage that all the mechanisms are open and above board, and at the same time extremely simple in con struction so that they can be most readily and easily kept in good repair and proper operating condition.

It is evident that many modifications in the specific embodiment of my invention may be made without departing in any wise from its generic spirit. I desire to cover all such modifications in the annexed claims.

What is claimed as new is:—

1. In a machine of the character described, a wrapper forming pocket, a wrapper strip feeding and severing mechanism for supplying wrappers to said pocket comprising a feed channel delivering on the level with the top of the forming pocket at one side thereof, means for feeding wrappers through said channel so as to overlie the said pocket, and means on the opposite side of said pocket to engage the end of the wrapper strip and aline the wrapper relative to said pocket.

2. In a machine of the character described, a traveling wrapper forming pocket, a wrapper strip feeding and severing mechanism for supplying wrappers to said pocket, comprising a feed channel delivering on the level with the top of said forming pocket at one side of the path of movement thereof, means for feeding wrappers through said channel so as to overlie said pocket, and means on the opposite side of the path of movement of said pocket in line with said feed channel to engage the end of the wrapper strip and aline it relative to said pocket.

3. In a machine of the character described, a wrapper forming pocket, wrapper strip feeding and severing mechanism for supplying wrappers to said pocket comprising a feed channel, means for feeding wrappers to the wrapper forming pocket through said channel, and alining pins on the far side of the pocket to aline the end of the strip relative to said pocket.

4. In a machine of the character described, a reciprocating wrapper forming pocket, means for feeding a wrapper strip to a position overlying said pocket, means on one side of the path of travel of said reciprocating pocket to engage and aline the strip relative thereto, means on the opposite side of the path of travel of said pocket to engage and aline said strip, means for severing a wrapper, a forming plunger coöperating with said pocket to form the wrapper, and means for moving said pocket with the formed wrapper into position to receive the commodity to be wrapped.

5. In a machine of the character described, a reciprocating wrapper forming pocket, means for feeding a wrapper strip to the pocket, means to engage and aline said strip relative to said pocket, means in coöperative relation to said alining means to engage the end of said strip to prevent buckling thereof, means for severing a wrapper from said strip, a forming plunger coöperating with said pocket to partially form a wrapper, and means for moving said pocket with a wrapper therein to a position to receive the commodity to be wrapped.

6. In a machine of the character described, a reciprocating wrapper forming pocket, means for feeding wrappers to the pocket, means for forming a wrapper in said pocket, means in said pocket to engage the side flaps of the formed wrapper and maintain the wrapper in set up position, means in the path of movement of said pocket for turning up the end flaps of the wrapper, and means for moving said pocket with the formed and set-up wrapper into position to receive the commodity to be wrapped.

7. In a machine of the character described, a movable wrapper forming pocket, a forming plunger having concaved surfaces to engage the ends of a wrapper strip, and coöperating wrapper-forming means comprising stationary convexed walls on opposite sides of the path of said pocket to co-act with said plunger to turn and position the ends of the wrapper strip.

8. In a machine of the character described, a charge forming device, a wrapping pocket, means for positioning the pocket to receive a charge from said device, means for feeding the commodity to be packed to the charge forming device from a column, means for transferring a charge from said forming device to said wrapping pocket, and means for interrupting the continuity of the column for maintaining the effective height of the feeding column approximately constant during the feeding operations, whereby a smooth transfer from the forming device to the wrapping pocket is had.

9. In a machine of the character described, a charge forming device, a wrapping pocket, means for positioning the pocket to receive a charge from said device, means for feeding the commodity to be packed to the charge forming device from a column, intermittently operating means for transferring a charge from said forming device to said wrapping pocket, and intermittently operating means for interrupting the continuity of the column for maintaining the effective height of the feeding column approximately constant during the feeding operations, whereby a smooth transfer from the forming device to the wrapping pocket is had.

10. In a machine of the character described, a charge forming device, a wrapping pocket, means for positioning the wrapping pocket to receive a charge from said device, means for feeding the commodity to be packed from a column, means for transferring a charge from said forming device to the wrapping pocket, and means for interrupting the continuity of the column to secure a gravity feed to the charge forming device from a column of substantially constant height, whereby a smooth transfer is had from the forming device to the wrapping pocket.

11. In a machine of the character described, a charge forming device, a wrapping pocket, means for positioning the wrapping pocket to receive a charge from said device, a chute for feeding the commodity to be packed to the charge forming device in column form, mechanical means for feeding the chute, means for transferring a charge from the forming device to the wrapping pocket, and a member operable by said transferring means for breaking the column during the feeding operation of the charge forming device from the column.

12. In a machine of the character described, a charge forming device, a wrapping pocket, means for positioning the wrapping pocket to receive a charge from said device, a chute for feeding the commodity to be packed to the charge forming device in column form, mechanical means for feeding the chute, means for transferring a charge from the forming device to the wrapping pocket, a member operable by said transferring means for breaking the column during the feeding operation of the charge forming device from the column, and means for restoring the column during the transfer of a charge to the wrapping pocket.

13. In a machine of the character described, a charge forming device, a wrapping pocket, means for positioning said pocket to receive a charge from said forming device, a chute for feeding the commodity to be packed to said forming device, means for transferring a charge from said forming device to said wrapping pocket, a cut-off in the chute above its mouth for breaking the column in the chute during the feeding operation, and a cut-off at its mouth for stopping the chute during the transferring operation.

14. In a machine of the character described, a charge forming device, a wrapping pocket, means for positioning said pocket to receive a charge from said forming device, a chute for feeding the commodity to be packed to said forming device, means for transferring a charge from said forming device to said wrapping pocket, a cut-off in the chute above its mouth for breaking the column in the chute during the feeding operation, and a cut-off at its mouth for stopping the chute during the transferring operation, both of which cut-offs are operable by said transfer means.

15. In a machine of the character described, a wrapping pocket, means for feeding wrapping material to said pocket, a supporting shelf or table between said pocket and said feeding means, and means coöperating with said supporting shelf to exert a rubbing action on and lay or smooth the wrapping material prior to its delivery to the pocket.

16. In a machine of the character described, a wrapping pocket, means for feeding wrapping material to said pocket, a shelf or table between said pocket and feeding means over which the wrapping material passes and by which it is supported, and a smoothing plate adjacent said table to exert a rubbing action on and lay and smooth the material passing over it prior to its delivery to said pocket.

17. A wrapping pocket comprising a main body, an open ended recess in said body, end retainers hinged to said main body and adapted to close the ends of said recess, and a single means biasing them to open and to closed positions.

18. A wrapping pocket comprising a main body having an open ended recess, hinged end retainers adapted to close the ends of said recess, means biasing said retainers to open and to closed positions comprising springs housed in said main body and links hinged to said retainers and acted on by said springs.

19. A wrapping pocket comprising a body portion having therein an open ended recess, end retainers for said recess, means for maintaining said retainers normally in closed position, and adjustable stop pins on said body portion to determine the position of closure of said end retainers.

20. In a machine of the character described, a charge delivering device, a wrapping pocket having end retainers which may be opened and closed, said end retainers having cut away portions on their sides next the pocket recess, means for positioning said pocket to receive a charge from said device with its end retainers open, means for supplying wrapping material to said pocket, means for transferring a charge and said wrapping material to the pocket, and means for closing said end retainers on the charge and about the wrapping material.

21. In a machine of the character described, a charge delivering device, a wrapping pocket having cut-away end retainers which may be opened and closed, means for transferring a charge from said device to said pocket, means biasing said end retainers to closed position, means for positioning said wrapping pocket to receive a charge with the retainers open, and means for tripping said retainers to closed position upon the reception of a charge by the wrapping pocket.

22. In a machine of the character described, a revolving turret, a wrapping pocket carried by said turret, said wrapping pocket having end retainers which may be opened and closed, and said end retainers having projections which extend toward the side of said turret, and dogs at fixed points beside said turret for engaging said projections and operating said end retainers.

23. In a machine of the character described, a charge forming device, a wrapping pocket, a transfer member in the pocket, means for positioning said pocket to receive a charge from said device, means for raising to the mouth of said pocket said member prior to the positioning of said pocket at the charge forming device, means whereby the transfer member is forced down to the bottom of the pocket by a charge, and means independent of said forcing means for insuring movement of said transfer member to the bottom of the pocket.

24. In a machine of the character described, a folding mechanism, a wrapping pocket for carrying a package in its unfolded wrapper, end retainers closing the ends of said wrapping pocket, means for positioning said pocket for a wrapper to be folded, and a pair of dogs adjacent the folding mechanism for opening the end retainers after the top flap of the wrapper has been turned whereby the ends of the wrapper may be tucked.

25. In a machine of the character described, a folding mechanism comprising top lapping members and end tucking members, said top lapping members operating in advance of said end tucking members, a wrapping pocket for carrying a package in its unfolded wrapper, end retainers connected with said pocket, means for positioning said pocket for the wrapper to be folded, and means for opening said end retainers after a top flap of the wrapper has been turned and before the end tuckers reach the end retainers.

26. In a machine of the character described, a folding mechanism, a wrapping pocket for carrying the commodity in its unfolded wrapper, end retainers associated with said pocket, means for positioning said pocket for the wrapper to be folded, and means comprising double jawed dogs for both opening and closing said end retainers.

27. In a machine of the character described and in combination, folding mechanism for folding a wrapper about a package, movable means for supporting such package, means for positioning said supporting means in proper relation to said folding mechanism for the folding of a wrapper, and adjustable means located in the path of movement of the wrapped package to maintain the wrapper folded after it has been acted on by the folding mechanism.

28. In a machine of the character described and in combination, folding mechanism for folding a wrapper about a package, movable means for supporting such package, means for positioning said supporting means in proper relation to said folding mechanism for the folding of a wrapper, and adjustable gravity operated means located in the path of movement of the wrapped package to maintain the wrapper folded after it has been acted on by the folding mechanism.

29. In a machine of the character described, folding mechanism for folding a wrapper about a package, package supporting means adapted to move a package in a curved path to and from said folding mechanism, means for positioning said supporting means in proper relation to said folding mechanism to wrap the package, and an adjustable wrapper holder conforming to the path of travel of said wrapper to maintain the wrapper in folded position after it has been acted on by said folding mechanism.

30. In a machine of the character described, a package transfer comprising a reciprocating main body provided with a transfer pocket having opposite rigid sides and opposed yielding sides for bodily receiving the package to be transferred.

31. A package transfer for a machine of the character described comprising a main body, and an open ended recess in said main body having opposed rigid sides for receiving a package, and yielding means which close the ends of said recess.

32. A package transfer for a machine of the character described comprising a main body, an open ended recess having opposed rigid sides, in said main body for receiving a package, and hinged end flaps biased inwardly of the pocket, and means for adjusting their normal position.

33. In a machine of the character described, a movable wrapping pocket for supporting a package to be wrapped, a transfer pocket reciprocating at right angles to the path of movement of said wrapping pocket for transferring a wrapped package from the wrapping pocket, means for positioning one pocket over the other, means for delivering a package from the wrapping pocket to the transfer pocket, and means for ejecting the package from the transfer pocket at a desired point.

34. In a machine of the character described, a movable wrapping pocket, a transfer pocket reciprocating at right angles to the path of movement of the wrapping pocket, said wrapping pocket being provided with end retainers for confining a package within the pocket, means for positioning said pockets for a transfer of a package from the wrapping pocket into the transfer pocket, means for making the transfer, and means operable prior to the transfer to open said end retainers.

35. In a machine of the character described, a wrapping pocket, a reciprocating package-transfer coöperating therewith, means for positioning said wrapping pocket to deliver a package to said transfer at one end of the path of movement of said package-transfer, a delivering chute at the other end of the path of movement of said transfer to receive and hold said package, and means to cause the delivery of the package from the transfer to the chute.

36. In a machine of the character described, a transfer pocket, a wrapping pocket, means for delivering a package from the wrapping pocket to the transfer pocket, and end flaps connected with the transfer pocket which turn the end flaps of the package as the package is transferred from one pocket into the other.

37. In a machine of the character described, a delivery chute, and means for wrapping a package comprising means for positioning an open wrapper in line with said chute, an ejector plunger provided with a spring toe operable upon movement of the plunger which folds one flap of the wrapper and fixed folding lugs on the sides of said delivery chute for folding another flap of said wrapper.

In testimony whereof I have hereunto set my hand in presence of two subscribing witnesses.

ELBERON D. SMITH.

Witnesses:
ARTHUR L. BRYANT,
J. P. TARBOX.